(12) United States Patent
Tatsumi et al.

(10) Patent No.: US 6,869,090 B2
(45) Date of Patent: Mar. 22, 2005

(54) SUPPORTING STRUCTURE OF SUB-FRAME IN SUSPENSION SYSTEM FOR VEHICLE

(75) Inventors: Hideharu Tatsumi, Tokyo (JP); Tetsuya Maruo, Tokyo (JP); Toshiyuki Matsuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 189 days.

(21) Appl. No.: 10/107,356

(22) Filed: Mar. 28, 2002

(65) Prior Publication Data

US 2002/0140220 A1 Oct. 3, 2002

(30) Foreign Application Priority Data

Mar. 28, 2001 (JP) .......................... 2001-093682
May 28, 2001 (JP) .......................... 2001-158976

(51) Int. Cl.[7] ............................................. B62D 21/11
(52) U.S. Cl. ................................ 280/124.109; 280/788
(58) Field of Search ................................. 280/781, 788, 280/124.09; B62D 21/11

(56) References Cited

U.S. PATENT DOCUMENTS

| 2,939,720 | A | * | 6/1960 | Wroby | 280/124.108 |
| 4,059,286 | A | * | 11/1977 | Otto et al. | 280/124.109 |
| 4,531,761 | A | * | 7/1985 | von Sivers | 280/785 |
| 4,671,531 | A | * | 6/1987 | Sautter et al. | 280/124.109 |
| 4,720,120 | A | | 1/1988 | Shimatani et al. | |
| 4,906,018 | A | * | 3/1990 | Kijima et al. | 280/124.109 |
| 5,042,837 | A | | 8/1991 | Kleinschmit et al. | |
| 5,181,736 | A | * | 1/1993 | Kokubun | 280/124.109 |
| 5,222,758 | A | | 6/1993 | Sakai et al. | |
| 5,560,651 | A | | 10/1996 | Kami et al. | |
| 5,862,877 | A | | 1/1999 | Horton et al. | |
| 5,887,896 | A | | 3/1999 | Kobayashi et al. | |
| 5,899,490 | A | | 5/1999 | Wipasuramonton et al. | |

FOREIGN PATENT DOCUMENTS

| DE | 39 27 924 | 8/1990 |
| DE | 197 03 951 | 8/1997 |
| EP | 0 891 915 A2 * | 7/1998 |
| EP | 0 927 680 | 7/1999 |
| FR | 2 459 751 | 1/1981 |

* cited by examiner

*Primary Examiner*—Ruth Ilan
(74) *Attorney, Agent, or Firm*—Smith, Gambrell & Russell, LLP

(57) ABSTRACT

A supporting structure of a sub-frame for a suspension system contains a body frame, a sub-frame, elastic bushings, each having an inner cylinder having a lower edge. And an outer cylinder and an elastic member are interposed between the inner and outer cylinders. The sub-frame is supported on the body frame via the elastic bushings, at least one of first stay extends along the body frame, and at least one second stay extends along the body frame in a different direction from the first stay. Both ends of each of the fist and second stays respectively are supported on the lower edge of the inner cylinder and the body frame.

3 Claims, 13 Drawing Sheets

SUPPORTING STRUCTURE OF SUB-FRAME IN SUSPENSION SYSTEM FOR VEHICLE

BACKGROUND OF THE INVENTION

1. Field of the Invention

The present invention relates to a supporting structure of a sub-frame used in a suspension system for a vehicle, particularly to the structure for supporting the sub-frame which extends in a widthwise direction of the vehicle and supports left and right suspension members through an elastic bush.

2. Discussion of the Related Art

FIGS. 12, 13 and 14 are schematic drawings for illustrating a known supporting structure of a sub-frame used in a suspension system for a vehicle. An arrow indication "Fr" represents a forward direction of the vehicle, the arrow indication "L" does a leftward one seen from a back side of the vehicle toward running direction and the arrow indication "U" does an upward direction thereof shown in the figures.

A body frame 1 comprises a pair of main frames 2 and a body cross member 6. Both main frames 2,2 are separately provided to extend in parallel with each other under the vehicle in a lengthwise direction (not shown) and to connect to the body cross member 6. And, a sub-frame 10 for a suspension extend in a widthwise direction under the body frame 1.

The sub-frame 10 is integrally assembled by arranging in parallel crosses of a pair of front sub-frames 11,12 separated in the widthwise direction and extended in the lengthwise direction and a pair of longitudinal sub-frames 13,13 separated in the lengthwise direction and extended in the widthwise direction. And, housings 20,20 are supported on both sides of the sub-frame 10 via so-called a multi-link rear suspension.

The housing 20 supports rear wheels 26 so as to permit rotation of the wheels 26, and is supported by a plurality of lateral rods 23, 24 and 25 and radius arms 22 so as to be movable in a vertical direction. The lateral rods 23, 24 and 25 extend in the vehicle widthwise direction approximately in parallel with each other and have spaces therebetween. The radius arm 22 extends from the housing 20 to the vehicle front, with an end being supported by the bottom surface of the main frame 2 by way of a bracket 80.

The sub-frame 10 is supported by the main frames 2 through elastic bushings 210.

The elastic bushings 210 are respectively placed at both sides of the front sub-frame 11. As shown in FIG. 13, which is a cross-section of a part shown in FIG. 12 cut along F—F, each elastic bushing 210 contains an inner cylinder 211, an outer cylinder 212 and an elastic member 213 so as to absorb a vibration generated from the inner cylinder 211 and the outer cylinder 212. An installation bolt 230 is inserted through the inner cylinder 211. Accordingly, the inner cylinder 211 is fixed to the main frame 2 by the installation bolt 230 in such a state that an upper edge 211b of the inner cylinder 211 contacts a bottom face 3 of the main frame 2. The outer cylinder 212 is pressed into a bushing fitting hole 14 of the sub-frame 10. The elastic member 213 prevents noise and vibration generated from the inner cylinder 211 and the outer cylinder 212. A washer 240 is interposed between a bottom surface 211a of the inner cylinder 211 and a bolt head 230a of the installation bolt 230. The washer 240 restrains downward shift (displacements) of the sub-frame 10 with respect to the main fame 2.

FIG. 14 is a cross-section cut along G—G shown in FIG. 12. Elastic bushings 210 with the same structure are provided at both sides of the rear sub-frame 12. The inner cylinder 211 of the elastic bushing 210 is fixed to the body cross member 6 by the installation bolt 232 in such a manner that the bottom surface 211a of the inner cylinder 211 is linked with the body cross member 6 by a stay 220 which extends in the widthwise direction.

The stay 220 is made by bending a plate so as to approximately from a craned shape. The stay 220 has an upper plate 221 supported by the body cross member 6 by contacting a bottom face 6a; a lower plate part 222 supported by a lower edge of the elastic bushing 210; and a connecting part 223 which connects the upper plate part 221 and the lower plate part 222.

As shown in FIG. 12, the upper plate part 222 of the stay 220 is fixed to the bottom face 6a by two fastening bolts 231 at two positions of the stay 222 spaced apart in a lengthwise direction of the vehicle body. FIG. 14 shows that the lower plate part 221 is fastened between a bolt head 232a of an installation bolt 232 and a lower edge 211a of the inner cylinder 211.

The stay 220 with the above-mentioned structure is effective to maintain a supporting strength of the elastic bushing 210 supported between the lower edge 211a and the body cross member 6. Accordingly, the deformation of the installation bolts 230 and 231, and hence the deformation of the bottom face 3 of the main frame 2 which supports the installation bolts 230 and 231 can be restrained when a load applied to a suspension is transmitted to the sub-frame 10. Thus, drivability and stability of the vehicle can be attained by suppressing of the displacement of the sub-frame 10.

However, in a case where a strong load is applied to the sub-frame 10 in the lengthwise direction of the body by sudden start or acceleration on a rough road, or turning at a high speed, the force is transmitted to the outer cylinders 212 of the elastic bushings 210 in the lengthwise direction. In the above-mentioned known sub-frame support structure, there is a possibility that the supporting strength of the elastic bushings 210 is not sufficient to absorb such a high load, and that the installation bolts 230 and 232 and the bottom face 3 of the main frame 2 may be deformed. As a result, the inner cylinders 211 could be displaced in the lengthwise direction of the body with respect to the main frame 2.

In particular, the elastic bushings 210 which support both ends of the front sub-frame 11 are connected with the main frame 2 by the installation bolts 230, each by simply screwing the end of the installation bolt 230 to a nut 4 without support at the side of the bolt head 230a.

Accordingly, if a large force is applied to the sub-frame 10 in the lengthwise direction on either lateral side of the vehicle, when driving on a rough road, the inner cylinder 211 of the elastic bushing 210 at one lateral side could be displaced in the lengthwise direction of the vehicle body. Then, the elastic bushing 210 receives a force in the widthwise direction, which brings about the displacement of the inner cylinder 211 in the widthwise direction, whereby the sub-frame 10 could be displaced in any direction in a common plane with the main frame 2. In this case, the toe angle of the housing 20 supported by the sub-frame 10 is also changed, thereby affecting the drivability and stability.

It is also possible to maintain the drivability and stability by restraining the change of the toe angle and by setting the elasticity of the elastic members 213 to a lower value so as to increase the strength to support the suspension. By this measure, however, it becomes difficult to control the vibration and sound effects to the sub-frame 10 from the load applied to the suspension.

Moreover, as shown in FIG. 12, peripheral equipments, for example, a fuel tank 15, fuel-related members 16 such as a filler pipe 16a and a fuel pipe 16b, and a braking system members 17 which communicate with the housing 20 such as a brake fluid hose 17a, a hand brake cable 17b, an ABS sensor harness 17 located around the sub-frame 10.

Therefore, when the stay 220 is provided, it is necessary to have a distance from the stay 220 to the equipments. Moreover, in case an impact load is applied from the rear portions or the lateral sides of the vehicle, it is necessary to minimize influences to the equipments and body members so that fundamental functions of the equipments and the body members can be maintained. For that reason, it is necessary to considerably change the design of the body when the stay 220 is employed. For instance, if the positional relationship between the fuel tank 15 and the sub-frame 10 is changed, the capacity of the fuel tank 15 must be smaller, and the wheelbase must be longer.

OBJECT AND SUMMARY OF THE INVENTION

It is therefore a first object of the present invention to provide a sub-frame support structure, wherein the displacement of the sub-frame with respect to a body frame in longitudinal directions of stays is restrained or decreasing vibration and for attaining an excellent drivability and stability of a vehicle, by making a body frame lower and to face to a bottom face of the vehicle body, a sub-frame for supporting suspension members, the sub-frame extending in a widthwise direction and provided at a lower position than the body frame, elastic bushings, each having an inner cylinder, an outer cylinder and an elastic member interposed between the inner cylinder and the outer cylinder, the inner cylinder having a vertically extending center axis, an inner cylinder upper edge and an inner cylinder lower edge, the inner cylinder upper edge being fixed to the body frame lower face, and the outer cylinder provided coaxially to the inner cylinder and fixed to the sub-frame, the sub-frame being supported on the body frame via the elastic bushings, at least one first stay extending along the body frame from a first stay first end to a first stay second end, the first stay first end being supported on the inner cylinder lower edge, and the first stay second end being supported on the body frame; and at least one second stay extending along the body frame from a second-stay first end to a second stay second end in a different direction from the first stay, the second-stay first end being supported on the inner cylinder lower edge, and the second-stay second end being supported on the body frame.

A second object of the present invention is to provide the sub-frame support structure, by which the displacement of the sub-frame in a lengthwise direction of the vehicle body and in the widthwise direction is restrained, changes of a toe angle defined by wheels are minimized, and the drivability and stability are improved by the body frame comprising a pair of main frames, each extending in a lengthwise direction and spaced from each other in the vehicle widthwise direction, and a body cross member extending in the vehicle widthwise direction connecting the main frames, the at least one first stay comprising a pair of the first stays, and the first stays respectively extending along the main frames, each of the first stays having the first stay first end supported on an inner cylinder lower edge, and the first stay second end supported on one of the main frames, and the at least one second stay extending along the body cross member in a vehicle widthwise direction, the second-stay first end being supported on an inner cylinder lower edge, and the second-stay second end being supported on the body cross member.

A third object of the present invention is to provide the sub-frame support structure, by which the first stays resist a load in a lengthwise direction of the vehicle body, the displacement of a rear part of the sub-frame and hence the displacement of a front part of the sub-frame in the lengthwise direction is restricted, and rotational displacement of the sub-frame is also prevented when a load applied to the suspension members is transmitted to either of left or right side of the sub-frame in the lengthwise direction of the vehicle body, by the sub-frame including a sub-frame front part and a sub-frame rear part, the elastic bushings provided on the sub-frame front part and the sub frame rear part, each of the first stays connecting an inner cylinder lower edge of one of the elastic bushings provided on the sub-frame front part and one of the main frames, and the at least one second stay comprising a pair of second stays, and connecting an inner cylinder lower edge of one of the elastic bushings provided on the sub-frame rear part and the body cross member.

A fourth object of the present invention is to provide a sub-frame support structure, wherein the displacement of the sub-frame with respect to the body frame in the longitudinal direction of the first stay is restrained, the displacement in the vehicle widthwise direction is restricted to a large extent by further increasing a support strength of the second stay via the elastic bushings so as to reduce the vibration property and to attain an excellent drivability and stability of the vehicle, and the change of the toe-angle is minimized, by comprising a body frame having a body frame lower face to be provided on a bottom face of a vehicle body, the body frame comprising a pair of main frames, each of the pair of main frames extending in a lengthwise direction and spaced from each other in a vehicle widthwise direction, and a body cross member extending in a vehicle widthwise direction connecting the main frames, a sub-frame for supporting suspension members, the sub-frame extending in a vehicle widthwise direction and provided at a position below than the body frames, elastic bushings, each having an inner cylinder, an outer cylinder and an elastic member interposed between the inner cylinder and the outer cylinder, the inner cylinder having a vertically extending center axis, an inner cylinder upper edge and an inner cylinder lower edge, the inner cylinder upper edge being fixed to the body frame lower face, and the outer cylinder coaxially to the inner cylinder and fixed to the sub-frame, the sub-frame being supported on the body fRame via the elastic bushings, a pair of first stays respectively extending along the main frames, each of the first stays having a first stay first end supported on an inner cylinder lower edge, and a first stay second end supported on one of the main frames, and a second stay extending along the body cross member in a vehicle widthwise direction as a single body in approximately a straight line form, a first end of the second stay being supported on an inner cylinder lower edge provided on one of the main frames, a second end of the second stay being supported on an inner cylinder lower edge provided on another of the main frames.

A fifth object of the present invention is to provide a sub-frame support structure, wherein a stay is deformed by bending in a predetermined direction when a load is applied to the stay in a predetermined direction so as not to influence other equipments or members near the stay, and the displacement of the sub-frame with respect to the body frame in the longitudinal direction of the stay is restrained for decreasing vibrations, by comprising a body frame having a body frame lower face to be provided on a bottom face of a vehicle body, a sub-frame for supporting suspension members, the sub-frame extending in a vehicle widthwise direction and provided at a position below than the body frames, at least one elastic bushing having an inner cylinder, an outer cylinder and an elastic member interposed between the inner cylinder and the outer cylinder, the inner cylinder having a vertically extending center axis, an inner cylinder upper edge and an inner cylinder lower edge, the inner cylinder upper edge being fixed to the body frame lower face, and the outer cylinder provided coaxially to the inner cylinder and fixed to the sub-frame, the sub-frame being supported on the body frame via the at least one elastic bushing, and at least one stay extending along the body frame lower face from a first end to a second end, the first end being supported on the inner cylinder lower edge, and the second end being supported on the body frame, and the at least one stay is to be deformed by bending in a predetermined direction when a load is applied to the at least one stay from a predetermined direction.

A sixth object of the present invention is to provide the sub-frame support structure, wherein a strong stay can be easily obtained by decreasing the weight and the manufacturing cost, and a rupture of the stay due to forming in an acute angle is prevented, so that influences to the equipment nearby or the vehicle body is minimized, by the at least one stay comprising a bushing-side fixation fitting supported on the inner cylinder lower edge, a body frame-side fixation fitting supported on the body frame, and a elongated member having a first end connected to the bushing-side fixation fitting and a second end connected to the body frame-side fixation fitting.

A seventh object of the present invention is to provide the sub-frame support structure, wherein the stay is deformed by bending a center portion of an elongated hollow member in a predetermined direction without influencing equipments or members nearby when load is applied to the elongated hollow member in such a direction that a bushing-side the first fitting and the second fitting come closer to each other, and the clearance for peripheral equipment is kept, and the space for repairing can be maintained even under a normal condition, by the elongated hollow member having a bent shape so that a center part between the bushing-side fixation fitting and the body frame-side fixation fitting is dislocated by bending from a point on a straight line defined by connecting the bushing-side fixation fitting and the body frame-side fixation fitting.

A eighth object of the present invention is to provide the sub-frame support structure, wherein the stay is deformed by bending a center portion of the elongated hollow member in a predetermined direction without influencing the equipments or members nearby when a load is applied to the elongated hollow member in such a direction that a bushing-side fixation fitting and a body frame-side fixation fitting come closer to each other, by the elongated hollow member having a weak portion at a center part between the bushing-side fixation fitting and the body frame-side fixation fitting, the weak portion be deformable to bend in a predetermined direction when a load is applied to the at least one stay from a predetermined direction.

A ninth object of the present invention is to provide the sub-frame support structure, wherein it is easy to appropriately locate the elongated hollow member with respect to the bushing-side fixation fitting, and welding of the elongated hollow member to the bushing-side fixation fitting is easily performed, so that the productivity of the stay can be increased, by the bushing-side fixation fitting comprising a fixing part, a supporting part and an insertion hole, the fixing part fixed to the inner cylinder lower edge, the supporting part being integral with the fixing part, and extending in a direction which crosses a central axis of the elongated hollow member, the insertion hole provided on the supporting part for accepting the first end of the elongated hollow member and being subjected to welding.

A tenth object of the present invention is to provide the sub-frame support structure, wherein it is easy to appropriately locate the elongated hollow member with respect to the body frame-side fixation fitting, and welding of the elongated member to the body frame-side fixation fitting is easily performed, so that the productivity of the stay can be increased, by the body frame-side fixation fitting comprising a fixing part, a supporting part and an insertion hole, the fixing part fixed to the body frame, the supporting part being integral with the fixing part, and extends in a direction which crosses with a central axis of the elongated hollow member, the insertion hole provided on the supporting part for accepting the second end of the elongated hollow member and being subjected to welding.

A eleventh object of the present invention is to provide the sub-frame support structure, wherein earth mud and sand entered into the elongated hollow member come out of themselves, it is easy to wash the inside of the elongated hollow member, and the durability of the stay is increased by improving a rust prevention affect, by the at least one stay connects the inner cylinder lower edge and the body frame, at least one of the first end and the second end of the elongated hollow member located at a position below than a center part of the elongated hollow member between the bushing-side fixation fitting and the body frame-side fixation fitting.

A twelfth object of the present invention is to provide the sub-frame support structure, by which the displacement of the sub-frame in longitudinal directions of the first and the second stays for decreasing the vibrations in order to attain an excellent drivability and stability, and a stay is deformed by bending in a predetermined direction when the load is applied to the stay in a predetermined direction so as not to influence the equipments or members provided near the stay, by the at least one stay comprising at least one first stay and at least one second stay, the at least one first stay extending along the body frame, the bushing-side fixation fitting of the at least one first stay being supported on the inner cylinder lower edge, and the body frame-side fixation fitting of the at least one first stay being supported on the body frame, and the at least one second stay extending along the body frame in a different direction from the at least one first stay, the bushing-side fixation fitting of the at least one second stay being supported on the inner cylinder lower edge, and the body frame-side fixation fitting of the at least one second stay being supported on the body frame.

A thirteenth object of the present invention is to provide the sub-frame support structure, by which the displacement of the sub-frame in the lengthwise direction of the vehicle body and in the widthwise direction is restrained, the change of the toe-angle is minimized, and the drivability and stability are improved by the body frame comprising a pair of main frames, each extending in a lengthwise direction and spaced from each other in a vehicle widthwise direction, and a body cross member extending in a vehicle widthwise direction connecting the main frames, the at least one first stay comprising a pair of the first stays, and the first stays respectively extending along the main frames, each of the first stays connects the inner cylinder lower edge and one of the main frames, and the at least one second stay extending along the body cross member in a vehicle widthwise direction and connects the inner cylinder lower edge and the body cross member.

A fourteenth object of the present invention is to provide the sub-frame support structure, by which the first stays resist the load in the lengthwise direction of the vehicle body, the displacement of a rear part of the sub-frame and hence the displacement of a front part of the sub-frame in the lengthwise direction can be restricted, and rotational distortion/displacement of the sub-frame is also prevented when a load applied to suspension members is transmitted to either of left or right side of the sub-frame in the lengthwise direction of the vehicle body, by the sub-frame containing a sub-frame front part and a sub-frame rear part, by the at least one elastic bushings comprising elastic bushings provided on the sub-frame front part and elastic bushings provided on the sub-frame rear part, each of the first stays extending in a lengthwise direction connects an inner cylinder lower edge of one of the elastic bushings provided on the sub-frame front part and one of the main frames, and the at least one second stay comprising a pair of second stays, and each of the second stays extending in a vehicle widthwise direction connects an inner cylinder lower edge of one of the elastic bushings provided on the sub-frame rear part and the body cross member.

A fifteenth of the present invention is to provide the sub-frame support structure, wherein the displacement in the vehicle widthwise direction is restricted to a large extent by further increasing a support strength of the second stay via the elastic bushings, and the drivability and stability are further improved, by the at least one second stay extending along the body cross member in a vehicle widthwise direction as a single body in approximately a straight line, a first end of the second stay being supported on an inner cylinder lower edge provided on one of the main frames, a second end of the second stay being supported on an inner cylinder lower edge provided on another of the main frames.

DETAILED DESCRIPTION OF THE INVENTION (First Embodiment)

Figure 1:
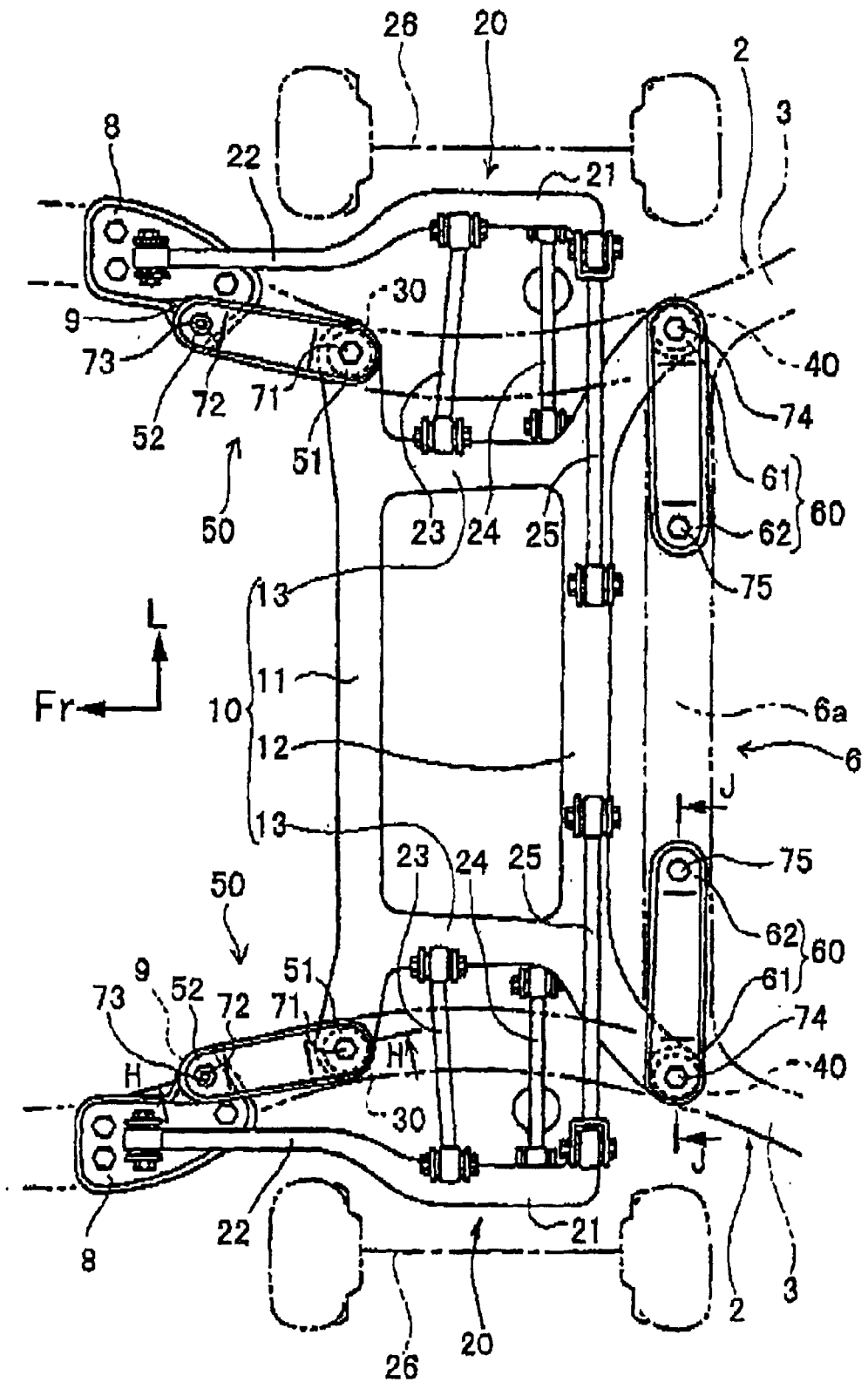
FIG. 1 is a schematic bottom view of a vehicle of a back side view or explaining a sub-frame support structure as a first embodiment of the present invention.
Figure 12:
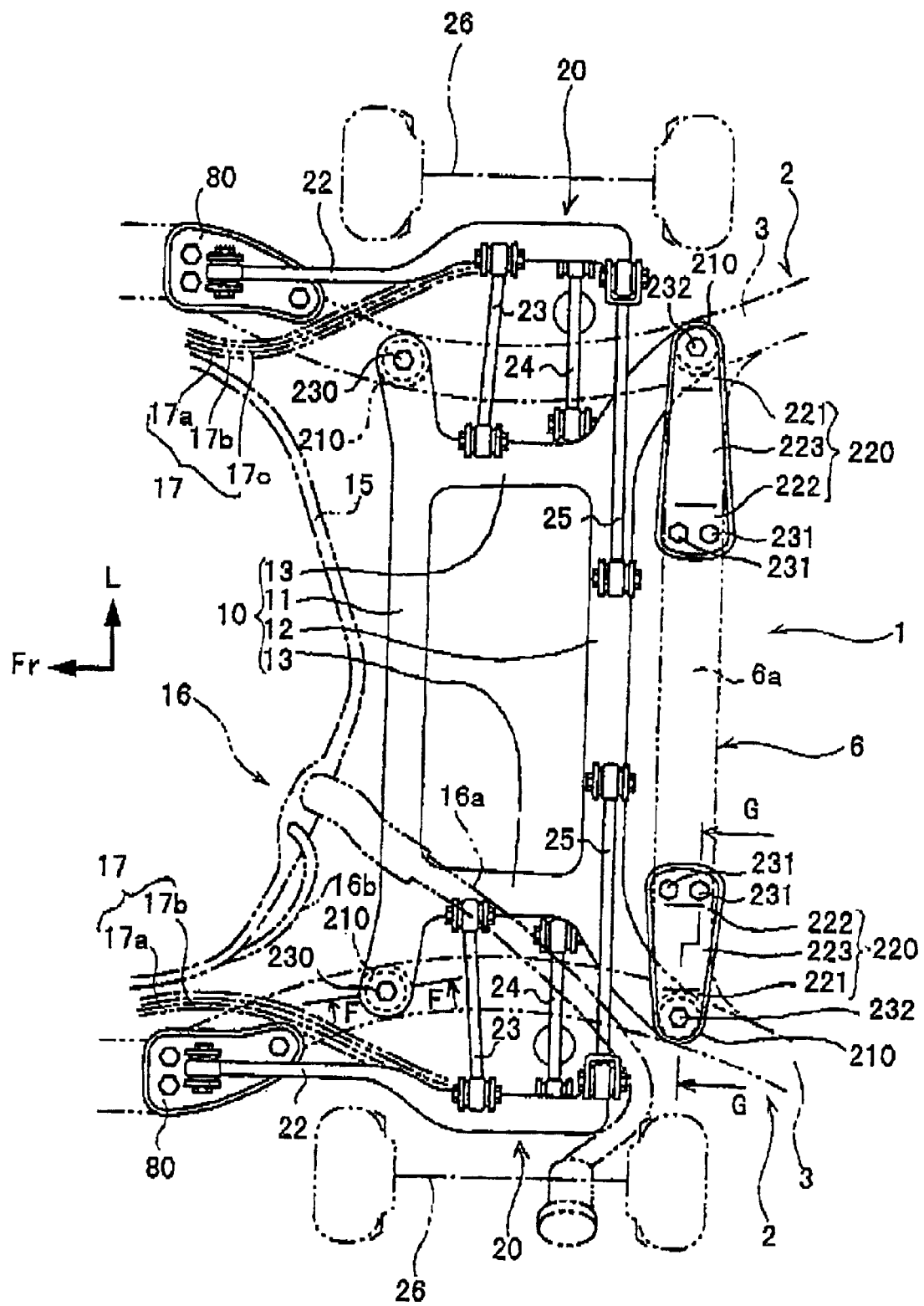
FIG. 12 is the schematic bottom view of a vehicle at a back side for explaining a known sub-frame support structure.
Figure 13:
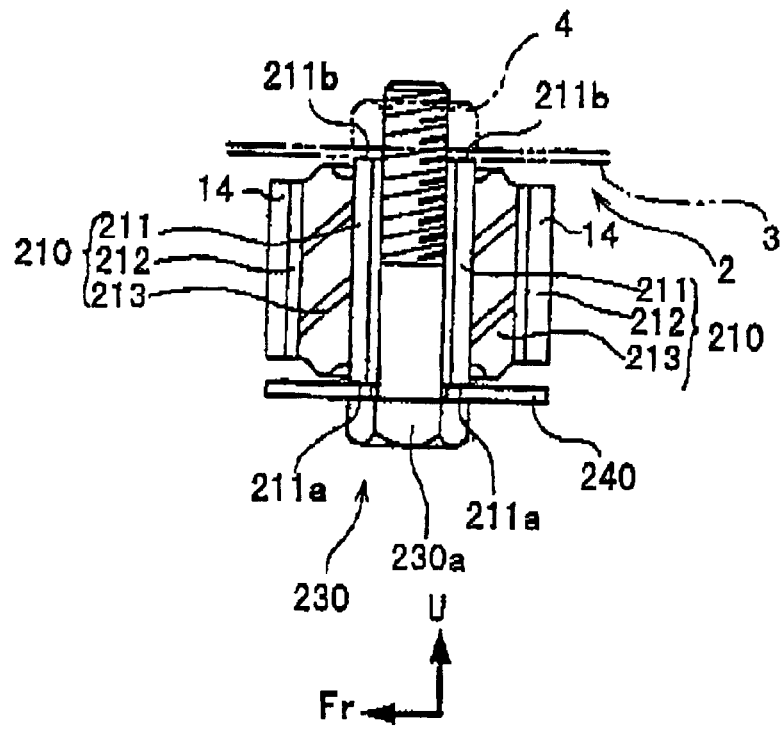
FIG. 13 is the cross-section of a part shown in FIG. 12 cut along F—F.
Figure 14:
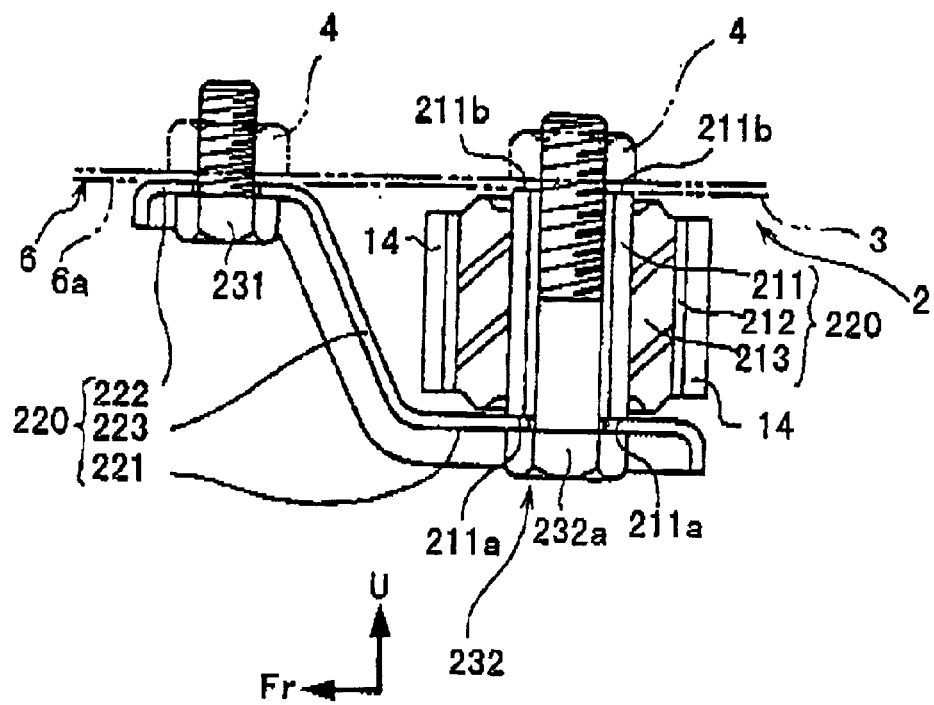
FIG. 14 is the cross-section of a part shown in FIG. 12 cut along G—G.

FIG. 1 is a bottom view of a vehicle at a back side thereof for explaining a supporting structure of sub-frame as a first embodiment of the present invention. In the figure, members corresponding to those in FIG. 12 are indicated by the same reference numerals, and the detailed explanations on these common members are omitted.

Each of main frame 2 and body cross member 6 has a cross-section in a U shape with a top being opened. The top is fixed to a bottom surface of a vehicle body (not shown) to close the top. On bottom faces 3 of the main frames 2 at parts where the body cross member 6 is connected, elastic bushings 40 are provided for supporting both ends of a rear sub-frame 12. In a front part of the vehicle body of the prior art, elastic bushings 30 are provided for supporting both ends of a front sub-frame 11 on the main frames 2.

Figure 2:
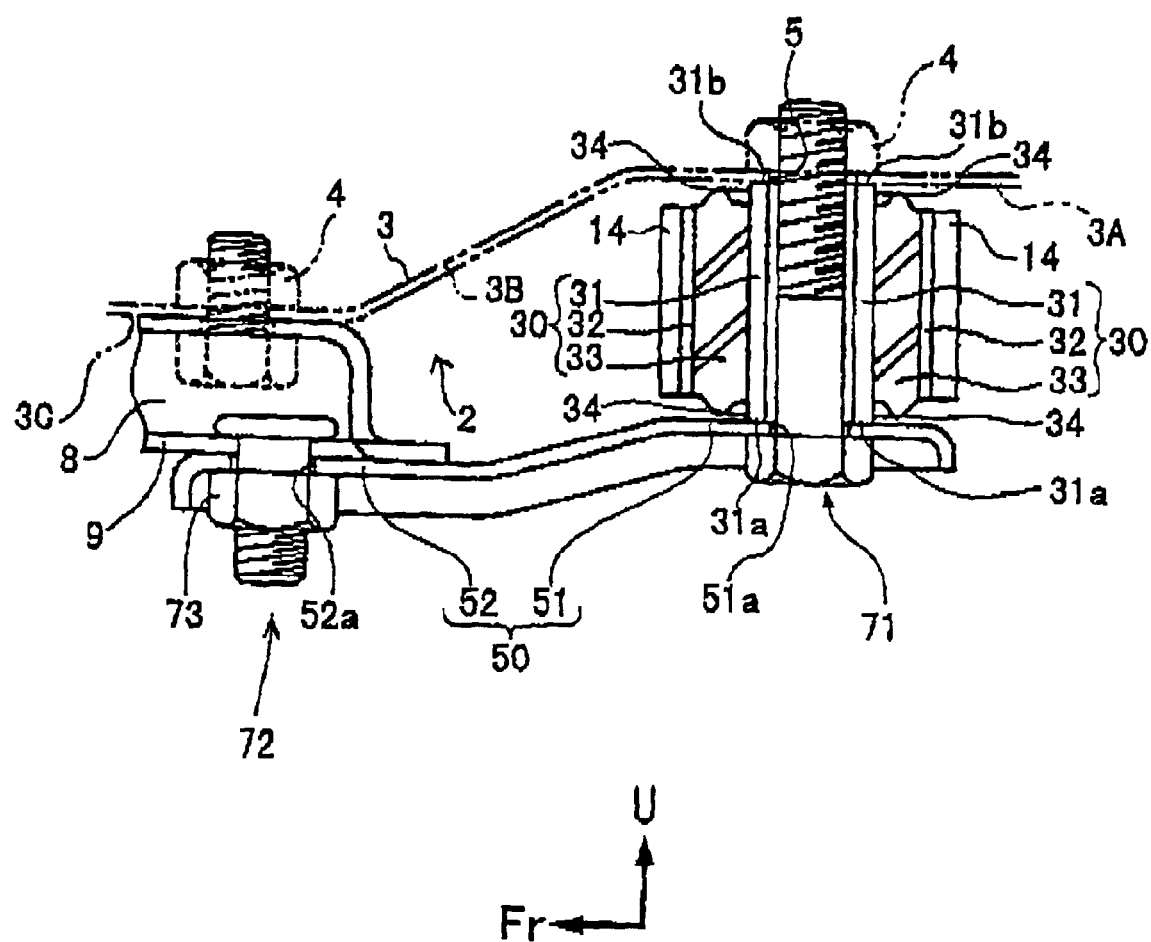
FIG. 2 is a cross-section of a part shown in FIG. 1 cut along H—H.

FIG. 2 is a cross-section of a part shown in FIG. 1 cut along H—H. As shown in FIG. 2, the elastic bushing 30 has an inner cylinder 31, an outer cylinder 32, and an elastic member 33 filling the space between the inner cylinder 31 and the outer cylinder 32. The inner diameter of the inner cylinder 31 is so decided that an installation bolt 71 can be inserted thereto, and the outer diameter thereof is decided satisfactory for being pressed into a bushing fitting hole 14. The elastic member 33 is for preventing vibrations restraining sound and noises. The inner cylinder 31 is longer than the outer cylinder 32 in the axial direction. The inner cylinder 31 and the outer cylinder 32 are located so as to have both edges of the inner cylinder 31 protruded from the edges of the outer cylinder 32. The elastic member 33 has edges basically in a same plane as those of the outer cylinder 32. Each edge of the elastic member 33 has a ring-shaped protrusion 34 formed to be higher than the edges of the outer cylinder 32 and lower than the edges of the inner cylinder 31.

The elastic bushing 30 is supported on the main frame 2 by the installation bolt 71 passed through the inner cylinder 31 from the bottom, and one end of the installation bolt 71 protruded from the elastic bushing 30 screwed against a weld nut 4 provided around an open 5 formed on the main frame 2.

The bottom face 3 of the main frame 2 has a bushing fixing surface 3A, an inclined surface 3B and a bracket fixing surface 3C. The bushing fixing surface 3A horizontally extends and the elastic bushing 30 is fixed thereto with the upper edge 31b of the inner cylinder 31 being in contact therewith. The inclined surface 3B which is integral with the bushing surface is stability inclined to a front lower direction with respect to the vehicle body, the horizontal surface 3C is integral with the inclined surface 3B and horizontally extends. A bracket 8 for supporting the radius arm 22 is fixed to the horizontal surface 3C.

Furthermore, a first stay 50, which extends in a lengthwise direction of the vehicle body along the bottom face 3 of the main frame 2 connects the bracket 8 and a lower edge 31a of the elastic bushing 30. The first stay 50 has an approximately planer shape with a flange to strengthen thereof. The first stay 50 has a hole 51a for inserting the installation bolt 71 on a first end 51, and an insertion hole 52a for accepting an installation bolt 72 on a second end 52.

The first end 51 is supported on the lower edge 31a of the elastic bushing 30 by accepting the end of the installation bolt 71 to the inner cylinder 31 through the hole 51a. The end of the bolt 71 is screwed against the weld nut 4.

On the other hand, the second end 52 of the first stay 50 is supported on the bracket 8 with opposing a lower face of a tongue 9 horizontally extending from the bracket 8 in the widthwise direction. The bracket 8 supports the second end 52 by accepting the installation bolt 72 projected on the tongue 9 through the insertion hole 52a. The installation bolt 72 is screwed against a nut 73.

Therefore, each of the inner cylinder 31 and the installation bolt 71 is supported at both ends, so that it is possible to increase the supporting strength of the support structure against a force in a lengthwise direction of the vehicle body, and the vibration can be also decreased. Thus, it is possible to restrain the deformation of the installation bolt 71 and the bushing surface 3A is transmitted to the sub-frame 10. Hence, it is possible to restrain the displacement of the front part of the sub-frame 10 in a lengthwise direction of the vehicle body.

Figure 3:
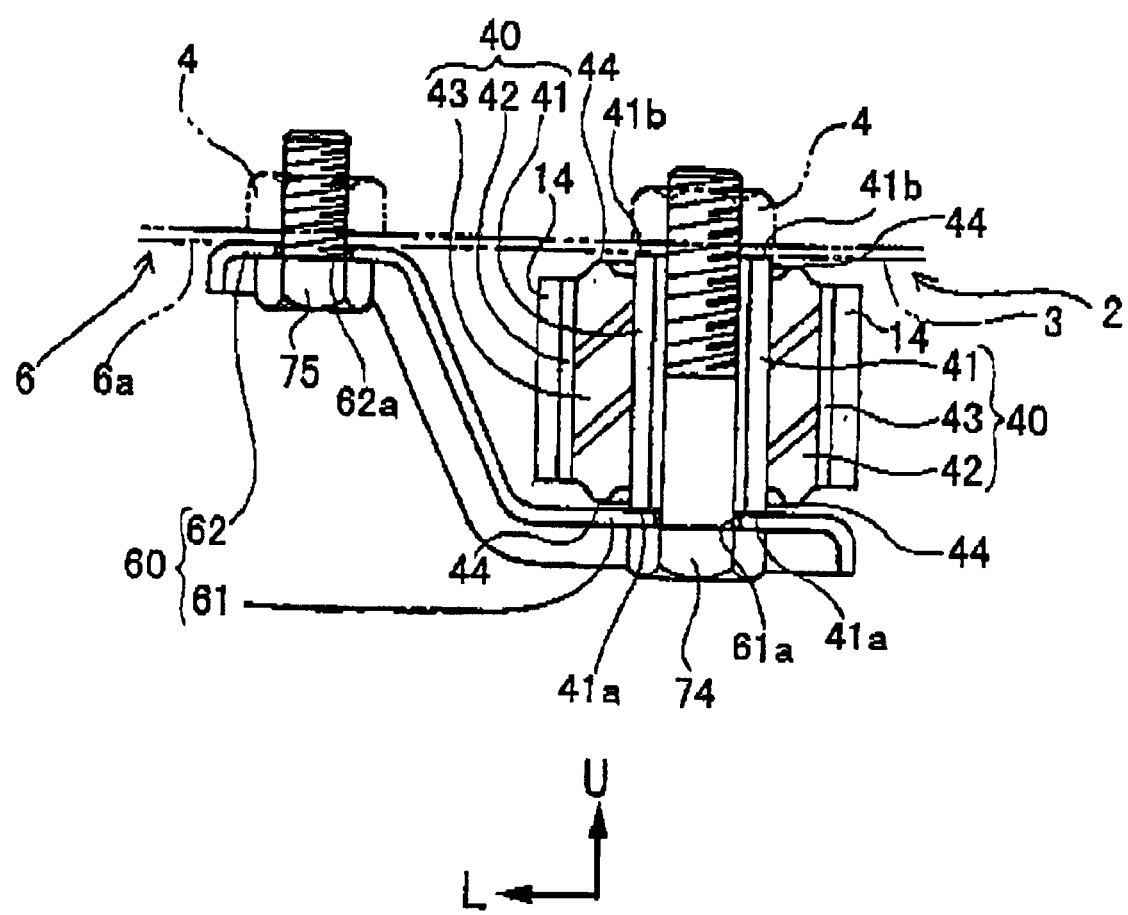
FIG. 3 is the cross-section of the part shown in FIG. 1 cut along J—J.

FIG. 3 is a cross-section of a part shown in FIG. 1 cut along J—J. The elastic bushings 40 support both ends of a rear sub-frame 12 on a main frame 2. The structure of the elastic bushing 40 is the same as that of the elastic bushing 30, and is fixed to the main frame 2 by an installation bolt 74. An upper edge 41b of an inner cylinder 41b contacts with a bottom face 3 of the main frame 2.

Furthermore, a second stay 60 extends along a bottom face 6a of a body cross member 6 in the widthwise direction, connecting a lower edge 41a of the inner cylinder 41 and the body cross member 6.

The second stay 60 is made of a planer member with a flange erected from over the entire periphery of the planer member for maintaining the strength. The second stay 60 has a penetration hole 61a or accepting the installation bolt 74 on a first end 61, and a penetration hole 62a for accepting an installation bolt 75 on a second end 62.

The first end 61 of the second stay 60 is supported on the lower edge of the elastic bushing 40 by accepting the installation bolt 74 in the inner cylinder 41 through the penetration hole 61a. The end of the installation bolt 74 is screwed against the weld nut 4.

On the other hands the second stay 60 extends in the widthwise direction from the first end 61 toward a vehicle body center, and the second end 62 of the second stay 60 contacts with the bottom face 6a of the body cross member 6. The end of the installation bolt 74 is inserted to the installation hole 62a, followed by screwing against the weld nut 4. Thus, the second stay 60 is supported by the body cross member 6.

Therefore, each of the inner cylinder 41 and the installation bolt 74 is fixed at both ends, so that it is possible to increase the supporting strength of the support structure against the force in the lengthwise direction of the vehicle body, and the vibration can be also decreased. Thus, it is possible to retain the deformation of the installation bolt 74 and the bottom face 3 of the main frame 2. Hence, it is possible to restrain the displacement of the rear part of the sub-frame 10 in the widthwise direction.

The function and the effect of the support statue of the suspension sub-frame 10 with the above-explained structure will now be explained in detail.

When the force is applied to the sub-frame 10 in a backward direction of the vehicle body, for instance, by sudden starting or acceleration, the force can be transmitted to the outer cylinder 32 of the elastic bushing 30 and the outer cylinder 42 of the elastic bushing 40 as the tree in the backward direction.

By the application of the force, the inner cylinders 31 and 41 of the elastic bushings 30 and 40 accept the force working in the backward direction of the vehicle body by way of the elastic members 33 and 43.

As mentioned previously, the end of the installation bolt 71 is supported on the bushing surface 3A, and the bolt head side of the installation bolt 71 is supported on the main frame 2 via the first stay 50. Because both ends of the installation bolt 71 an supported, the support strength against the force in the lengthwise direction of the vehicle body is improved. Accordingly, the deformation of the installation bolt 71 itself and the bushing surface 3A is restrained, and hence the displacement of the inner cylinder 31 to a backward direction of the vehicle can be minimized.

Furthermore, when the force is applied to the sub-frame 10 in the widthwise direction, for instance, by turning, the force is transmitted to the outer cylinder 32 of the elastic bushing 30 and the outer cylinder 42 of the elastic bushing 40 as the force in the widthwise direction.

By the application of the force, the inner cylinders 31 and 41 of the elastic bushings 30 and 40 accept the force working in the widthwise direction by way of the elastic members 33 and 43.

One end of the installation bolt 74 is supported on the bottom face 3 of the main frame 2, and the bolt head of the installation bolt 74 is supported on the body cross member 6 via the second stay 60. Because both ends of the installation bolt 74 are supported, the supporting strength of the support structure against the force in the widthwise direction is improved. Accordingly, the deformation of the installation bolt 74 itself and the bottom face 3 of the main frame 2 is restrained, and hence the displacement of the inner cylinder 41 to the widthwise direction is minimized.

Namely, the support structure of the invention restricts the displacement of the sub-frame 10 in the lengthwise and widthwise directions.

It is also possible that the force is applied to the sub-frame 10 in the lengthwise direction transmitted from the load applied to the suspension in one lateral side of the body, for example, by driving on the rough (bad) road. In such a case, the elastic bushing 40 on the corresponding lateral side of the vehicle body receives by the force toward the back of the vehicle body, and the elastic bushing 40 on the other lateral side of the body receives by the force toward the front. Further, the elastic bushing 30 on the one lateral side of the body is affected by the force toward the outer side of the vehicle with respect to the widthwise direction, and the elastic bushing 30 on the other lateral side of the body is affected by the force toward the inner side of the vehicle with respect to the widthwise direction.

In the present invention, the provision of the first stay 50 improves the supporting strength of the elastic bushings 30 in the lengthwise direction of the body, so that the backward displacement of the inner cylinder 31 is restrained. As a result, the displacement of an elastic bushing 40 provided at one lateral side of the body in the backward direction, and the displacement of another elastic bushing 40 provided at the other lateral side of the body in the forward direction are restrained.

In addition, it is possible to prevent that the elastic bushing 40 at one lateral side of the vehicle, and the busing 40 at the other lateral side thereof are displaced respectively in the outer and inner directions. This is because the provision of the second stays 60 improves the supporting strength of the elastic bushings 40 against the force in the widthwise direction, and the displacement of the inner cylinders 41 in the widthwise direction is restricted.

Consequently, it is possible to prevent the sub-frame 10 from rotational displacement along the lower surface of the body frame 1. Then, the change of the toe angle of the housing 20 is minimized, which is supported by the sub-frame 10 via a multi-link suspension. Therefore, the supporting strength of the sub-frame can be increased, thereby greatly improving the drivability and stability of the vehicle.

Moreover, since the rotational displacement of the sub-frame 10 along the lower surface of the body frame 1 is minimized, the installation bolt 75 does not easily loosen, which is used for fixing the second stay 60 on the body cross member side. It is also possible to decrease the number of the installation bolt 75 in comparison with the conventional structure.

The elastic bushings 30 and 40 have the elastic members 33 and 43 with protrusions 34 and 44 each on the upper and bottom edges as mentioned above. The protrusions 34 and 44 contact with the bottom face 3 of the main frame 2, the first end 51 of the first stay 50 or the first end 61 of the second stay 60, when the sub-frame 10 is vertically displaced with respect to the main frame 2 at the front sub-fame 11 or the rear sub-frame 12. Therefore, the direct contact of the outer cylinder 32 or 42 or the bushing hole 14 with the main frames 2 or the first stay 50 or 60 is prevented, and the transmission of noise and vibration is eliminated.

(Second Embodiment)

Figure 4:
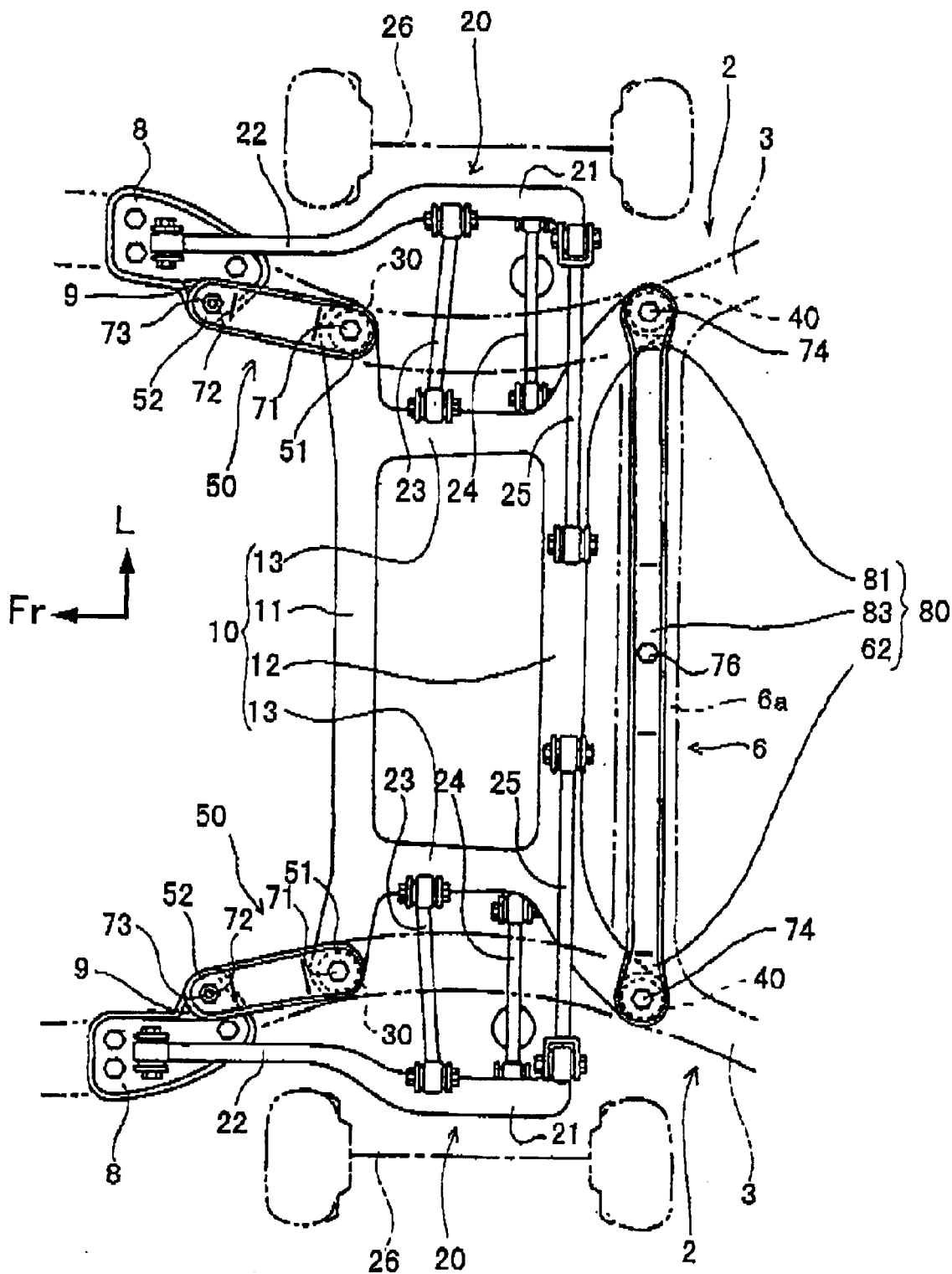
FIG. 4 is the schematic bottom view of a vehicle at a back side for explaining the sub-frame support structure as a second embodiment of the present invention.

FIG. 4 is a partial diagram for explaining a supporting structure of sub-frame as a second embodiment of the present invention. In the figure, members corresponding to those in FIG. 1 are indicated by the same reference numerals, and the detailed explanations on these common members are omitted. The characteristic point of the second embodiment is that a pair of second stays 60 which are provided on the right and left sides of the body in the first embodiment is replaced by a second stay 80 as an integral body extending approximately in a straight line in the widthwise direction, and a center part 83 of the stay 80 with respect to the widthwise is fixed by an installation bolt on a bottom face 6a of the body cross member 6.

The second stay 80 approximately has a planer shape having a flange erected from the entire periphery similarly to the first embodiment. A first end 81 of the second stay 80 is supported on a lower edge of the elastic bushing 40 provided on one of the main frames 2 at a rear side of the sub-frame 12.

On the other hand, the second stay 80 extends in the form of a straight line without a bent in the widthwise direction from the first end 81 to a second end 82, and the second end 82 is supported on the elastic bushing 40 provided on the other main frame 2 at the rear side of the sub-frame 12.

The center part 83 of the second stay 80 with respect to the widthwise direction is formed to have a face contacting with the bottom face 6a of the body cross member 6 over a predetermined length and is fixed by a installation bolt 76.

In addition to the function and effect described about the first embodiment, the strength of the second stay 80 in the widthwise direction can be further increased, and the support strength of the elastic bushing 40 in the widthwise direction can also be increased. Thus, the displacement of the sub-frame 10 at the rear part of the body in the widthwise direction can be prevented, and the improved drivability and stability can be attained. The installation of the second stay 80 to the body cross member 6 can be performed by a single installation bolt 76, whereby members to be used are decreased in number, assembly is simplified, and the number of the manufacturing process is decreased. Thus, the productivity of the sub-frame support structure is improved.

Furthermore, it is possible to use the elastic bushings 30 and 40 in different number for supporting the sub-frame 1 on the main frames 2 from those in the first and the second embodiments. It is also possible to provide the first stay 50 and the second stay 60 on a single bushing, or some bushings can be selectively used for supporting the stays 50 and 60. The locations to provide the stays or the longitudinal directions thereof are not restricted to the above embodiments and the provisions of the stays are not necessarily right-left symmetric, and can be front-back symmetric.

(Third Embodiment)

Figure 5:
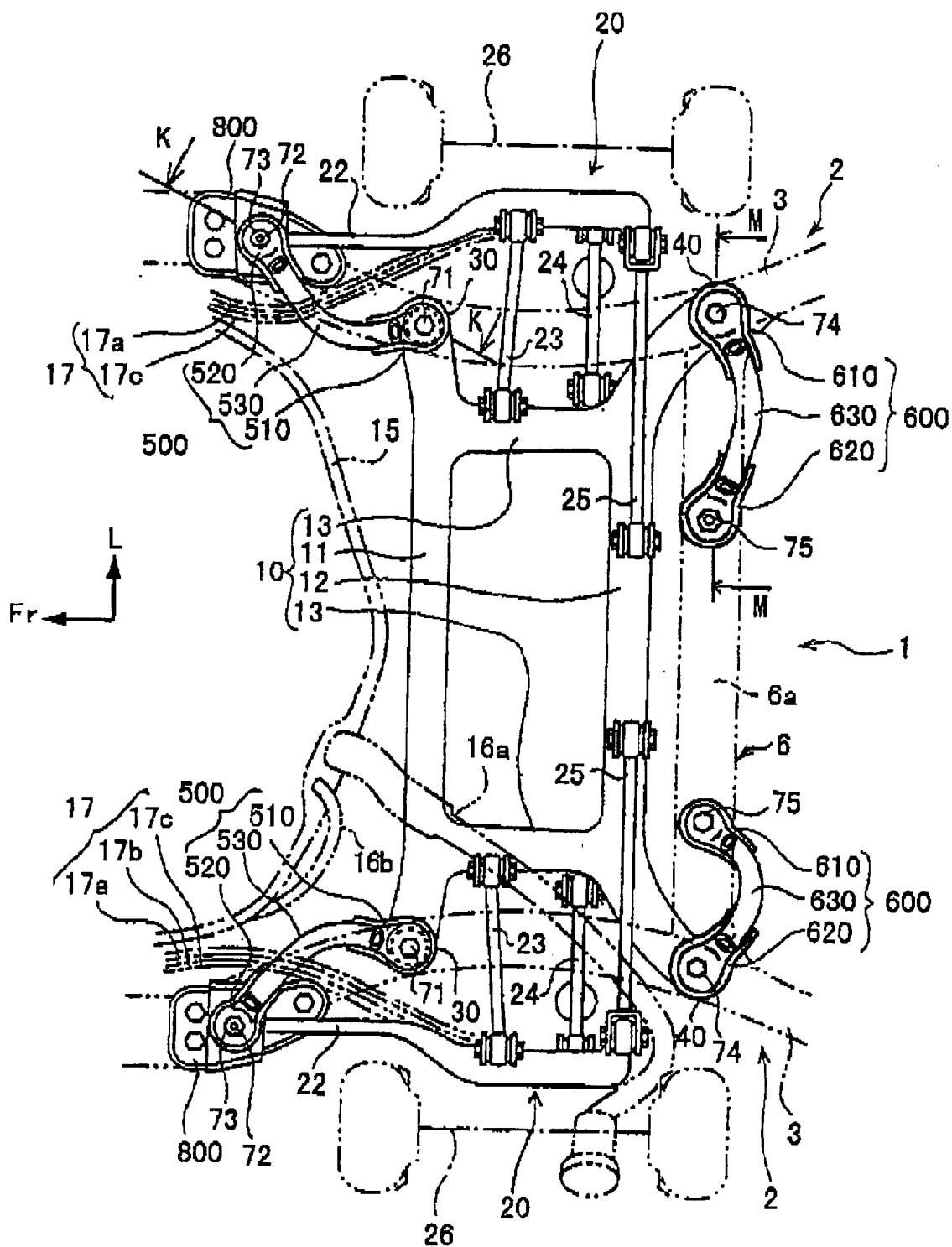
FIG. 5 is the schematic bottom view of a vehicle at a back side for explaining the sub-frame support structure as a third embodiment of the present invention.

FIG. 5 is a partial diagram for explaining a supporting structure of sub-frame as a third embodiment of the present invention. In the figure, members corresponding to those in FIG. 1 and FIG. 12 are indicated by the same reference numerals, and the detailed explanations on these common members are omitted.

Figure 6:
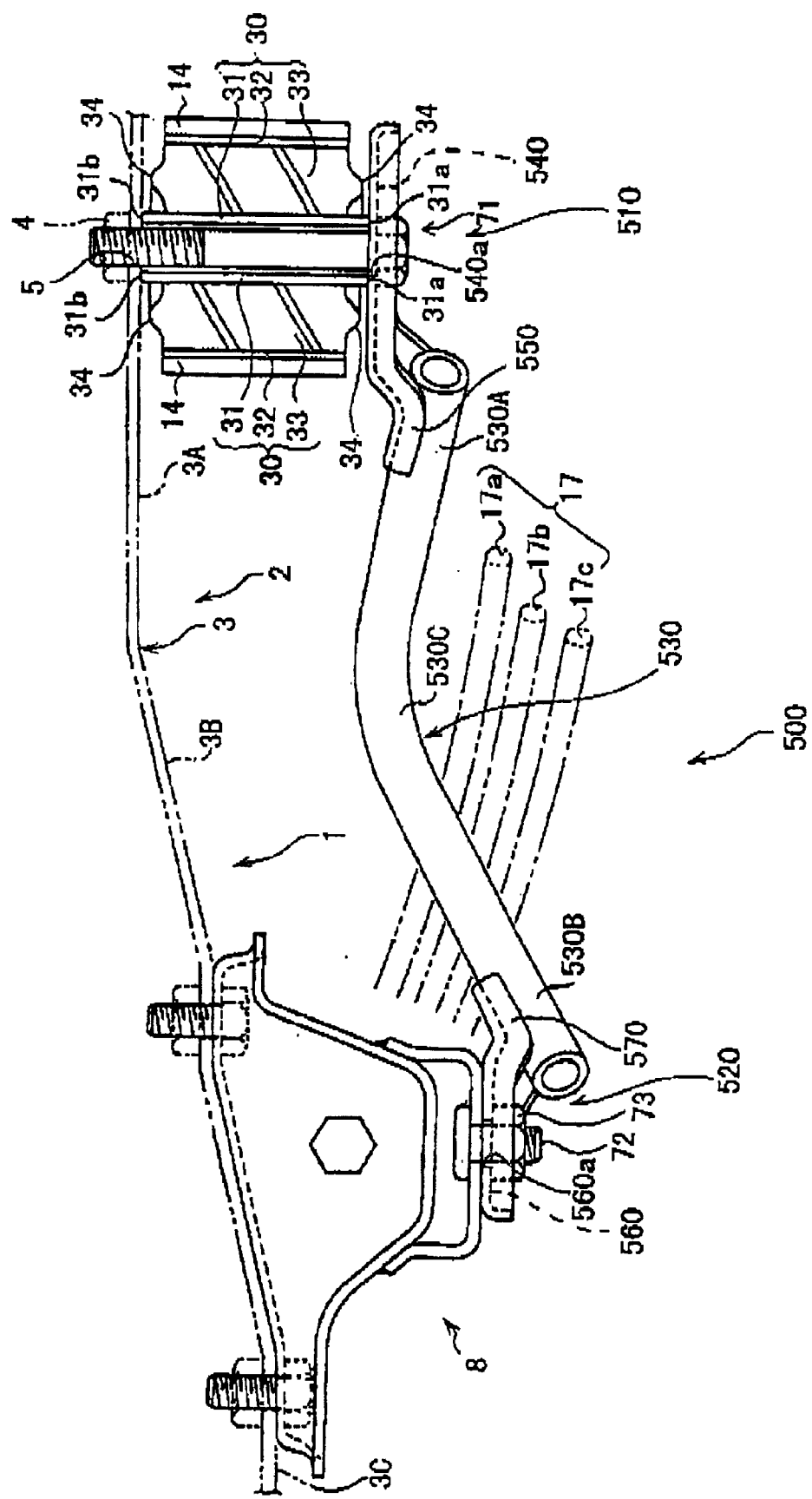
FIG. 6 is the cross-section of a part shown in FIG. 5 cut along K—K.

FIG. 6 is the cross-section of a part shown in FIG. 5 cut along K—K. The structure shown in FIG. 6 is basically the same as that shown in FIG. 2, and the bottom face 3 of the main frame 2 is composed of the bushing surface 3A, the inclined surface 3B and the horizontal surface, 3C. A bracket 8 is fixed between the inclined surface 3B and the horizontal surface 3C for supporting the radius arm 22 on the main frame 2.

A first stay 500 extends in the lengthwise direction of the body below the bottom face 3 of the main frame 2 connecting the bracket 8 and a lower edge 31a of an elastic bushing 30.

The first stay 500 has a bushing-side fitting 510 connected with the elastic bushing 30 at the bottom face 31a of an inner cylinder 31, a frame-side fitting 520 connected to the bracket 8, and a pipe 530 connecting the bushing-side fitting 510 and the frame-side fitting 520.

The bushing-side fitting 510 is formed by bending a planer member to drawing to have a bushing-side fixing part 540 and a bushing-side supporting part 550. The bushing-side part 540 is placed on the lower edge 31a of the inner cylinder 31 and fixed thereto. The bushing-side supporting part 550 extends from the bushing side connecting part 540 with a bent between the bushing-side supporting part 550 and the bushing-side connecting part 540. The pipe 530 is welded at a first end 530A to the bushing-side supporting part 550. The bushing-side part 540 has a penetration hole 540a for accepting an installation bolt 71. The bushing-side supporting part 550 extends along the pipe 530 at the first end 530A, and has a cross-section of a circular are at the part contacting with the outer periphery of the pipe 530.

Similarly to the bushing-side fitting 510, the body frame-side fitting 520 is formed in the same way as above, and has a bracket-side fixing part 560 and a bracket-side supporting part 570. The bracket-side fixing part 560 is fixed to the bottom face of the bracket 8, and the bracket-side supporting part 570 extends from the bracket-side connecting part 560 with a bent between the bracket-side connecting part 560 and the bracket-side supporting part 570. The pipe 530 is welded to the bracket-side supporting part 570 at a second end 530B. The bracket-side fixing part 560 has a penetration hole 560a for accepting an installation bolt 72 provided on the bottom face of the bracket 8. The bracket-side supporting part 570 extends along the pipe 530 at the second end 530B, and has a cross-section of a circular are at the part contacting with the outer periphery of the pipe 530.

The pipe 530 is formed by bending a cylindrical elongated member with an appropriate diameter and thickness selected based on necessary strength. As mentioned above, the first and seconds ends 530A and 530B of the pipe 530 are fixed by welding respectively to the bushing-side supporting part 550 and the bracket-side supporting part 570. The pipe 530 is arranged to have a center part 530C at a higher position than a straight line defined by connecting the first and the second ends 530A and 530B, the center part 530C shifted to a front direction of the vehicle body, and to have the first and the second ends 530A and 530B at a lower position than the center part 530C.

The bushing-side fitting 510 of the first stay 500 is placed to oppose the lower edge of the elastic bushing 30, one end of the installation bolt 71 is passed through the penetration hole 540a and the inner cylinder 31, and the bolt 71 is screwed against the weld nut 4, whereby the bushing-side fitting 510 is also supported by the lower edge of the elastic bushing 30. The body frame fitting 520 of the first stay 500 is supported on a bracket 8 by the bracket-side fixing part 560 placed to face the lower edge of the elastic bushing 30, the end of the installation bolt 72 passed through the penetration hole 540a and the inner cylinder 31, and the bolt 73 screwed against with a nut 73.

Each of the inner cylinder 31 of the elastic bushing 30 and the installation bolt 71 is thus supported at both ends, so that the supporting strength against a force in the lengthwise direction of the vehicle can be increased without vibration. Therefore, when a load is applied to the sub-frame 10 in a lengthwise direction of the body, transmitted from a load applied to the suspension, e.g., by the sudden starting and acceleration, the deformation of the installation bolt 71 and the bushing fixation surface 3A is suppressed. As a result, the displacement of the front part of the sub-frame 10 in the lengthwise direction can be restricted.

As mentioned previously, the first stay 500 is provided so as to have the first and the second ends 530A and 530B of the pipe 530 at the lower position than center part 530C. The inclination obtained by this configuration makes it possible to discharge muds and sands which may go into the pipe 530 from the ends 530A and 530B. Furthermore, it is easy to wash the inside of the pipe 530, the rust prevention effect of the first stay 500 is obtained, so that the durability of the first stay 500 is increased. Moreover, the bent shape of the pipe 53 creates a space below the pipe 53 for arranging a braking system members 17 such as a brake fluid hose 17a, a hand brake cable 17b, and an ABS sensor harness 17c. In other words, the clearance or the braking system members 17 under the normal condition, and the space for repairing the same can be maintained.

Figure 7:
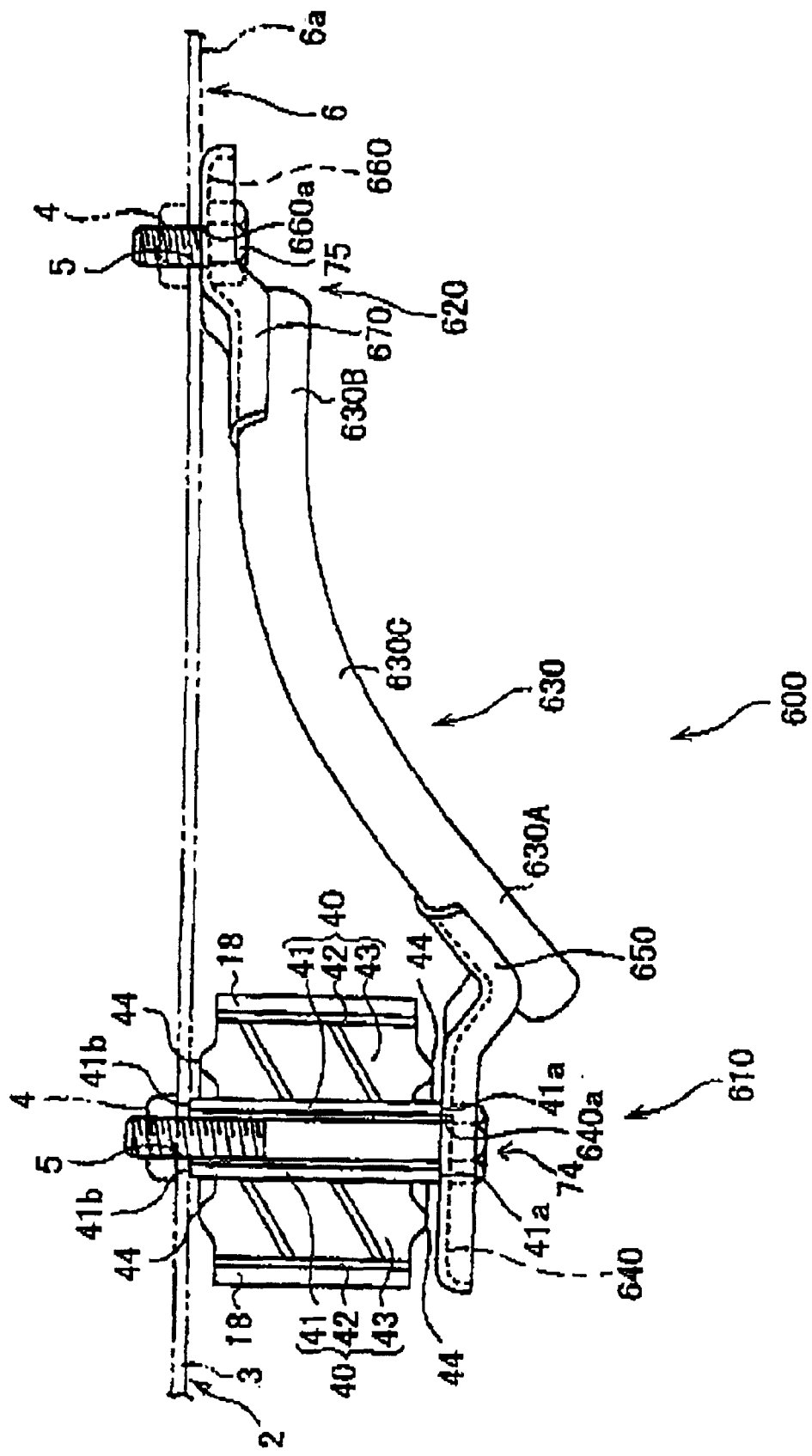
FIG. 7 is the cross-section of the part shown in FIG. 5 cut along M—M.

FIG. 7 is the cross-section shown in FIG. 5 cut along M—M. The elastic bushing 40 for supporting both ends of the rear sub-frame 12 also comprises the inner cylinder 41, the outer cylinder 42, and the elastic members 43, having the same structures and functions as those described relating to FIG. 3.

The elastic bushing 40 is supported an the main frame 2, by inserting an installation bolt 74 through the inner cylinder 41 from the bottom of the inner cylinder 41, and screwing one end of the bolt 74 against the weld nut 4 fixed by an opening 5 formed on the main frame 2.

A second stay 600 extends in the widthwise direction below the lower face 6a of the body cross member 6. One end of the second stay 600 is connected with the lower edge 41a of the inner cylinder 41, and the other end of the second stay 600 is connected with the body cross member 6.

The second stay 600 has a bushing-side fitting 610 connected with the elastic bushing 40 at the bottom face 41a of the inner cylinder 41, a body frame-side fitting 620 connected to the body cross member 6, and a pipe 630 connection the bushing-side fitting 610 and the body frame-side fitting 620.

The bushing-side fitting 610 is formed by subjecting a planer member to drawing to have a bushing-side fixing part 640 and a bushing-side supporting part 650 in the same way as that for bushing-side fitting 510 of the first stay 500. The bushing-side fixing part 640 is placed on the lower edge 41a of the inner cylinder 41 and fixed thereto, The bushing-side supporting part 650 extends from the bushing-side connecting part 640 with the bent between the bushing-side supporting part 650 and the bushing-side connecting part 640. The pipe 630 is welded at a first end 630A to the bushing-side supporting part 650. The bushing-side fixing part 640 has a penetration hole 640A through which an installation bolt 74 is penetrated. The bushing-side supporting part 650 extends along the pipe 630 at the first end 630A and has a cross-section of the circular are at the part contacting with the outer periphery of the pipe 630.

Similarly to the bushing-side fitting 610, the body frame-side fitting 620 is formed with a planer member by drawing the same, and has a member-side fixing part 660 and a member-side supporting part 670. The member-side fixing part 660 is fixed to the bottom face 6a of the body cross member, and the member-side supporting part 670 extends from the member-side connecting part 660 having the bent between the member-side fixing part 660 and the member-side supporting part 670, The pipe 630 is welded to the member supporting part 670 at a second end 630B. The member-side fixing part 660 has a penetration hole 660a for accepting an installation bolt 75. The member-side supporting part 670 extends along the pipe 630 at the second end 630B, and has the cross-section of the circular are at the member-side supporting part 670.

The pipe 630 is formed in the same manner as that for the above-mentioned pipe 530. The first and seconds ends 630A and 630B of the pipe 630 are fixed by welding respectively to the bushing-side fixation fitting 610 and the body frame-side fitting 620.

The bushing-side fitting 610 is supported on the lower end of the elastic bushing 40 and the body-frame-side fitting 620 is supported on the lower face 6a of the body cross member 6. In this case, the pipe 630 is arranged to have a center part 630C at an upper position than a straight line connecting the first and the second ends 680A and 630B, and the first and the second ends 630A and 630B lower position than the center part 630C.

The bushing-side fitting 610 of the first stay 600 is placed to oppose the lower edge of the elastic bushing 40, one end of the installation bolt 74 is passed through the penetration hole 640a and the inner cylinder 41, and then the bolt 74 is screwed against the weld nut 4. The body frame-side fitting 620 of the second stay 600 is supported on the lower face 6a of the body cross member 6 by an end of the installation bolt 75 passed through the penetration hole 66a inside the inner cylinder 31, and then the bolt 73 screwed against the weld nut 4.

As is understood from the above, each of the inner cylinder 41 of the elastic bushing 40 and the installation bolt 74 are supported at both ends, so that the supporting strength of the support structure in the widthwise direction can be increased without the vibrations, Therefore, when a load is applied to the sub-frame 10 in the widthwise direction, transmitted from a load applied to the suspension, e.g., when the vehicle is turning, the deformation of the installation bolt 74 and the lower face 3 of the main frame 3 are suppressed. As a result, the displacement of the rear part of the sub-frame 10 in the widthwise direction can be eliminated.

Since the pipe 630 of the second stay 600 has the inclination obtained with the center part 630C which is located at the lower position than the first and the second ends 680A and 630B, it is possible to discharge earth (muds) and sands, it is easy to wash the inside of the pipe 630 as mentioned relating to the first stay 500. The durability of the pipe 630 can be increased by the high rust prevention effect. As also mentioned above relating to the first stay 500, a space is created below the pipe 630 which can be used for the clearance for the braking system members 17 under a normal condition, and as the space for repairing the same.

The sub-frame support structure as the third embodiment has the same effects as mentioned on that of the first and the second embodiments.

In addition to the above, when the first stay 500 accepts an impact load in the lengthwise direction of the body, or when the second stay 600 accepts an impact load in the widthwise direction, the pipe 530 or 630 which is in a curved form can be bent with the center part 530C or 630C deformed in an upper direction with respect to the body, Therefore, it is possible to prevent the pipe 530 from being interfered with the braking system members 17 located at lower positions than that of the pipe 530, or to prevent the pipe 630 from being interfered with other members. If the pipe 530 or 630 is interfered with the other members or body members by bending as mentioned above, it is possible to minimize the influence on the other members or the like to such a degree that the initial function of the equipment is not lost. This is because the pipes 530 and 630 has the same cylindrical outer shapes as those of the first and second stays 500 and 600. Moreover, the strength of the stay and the drivability and stability can be maintained.

(Fourth Embodiment)

Figure 8:
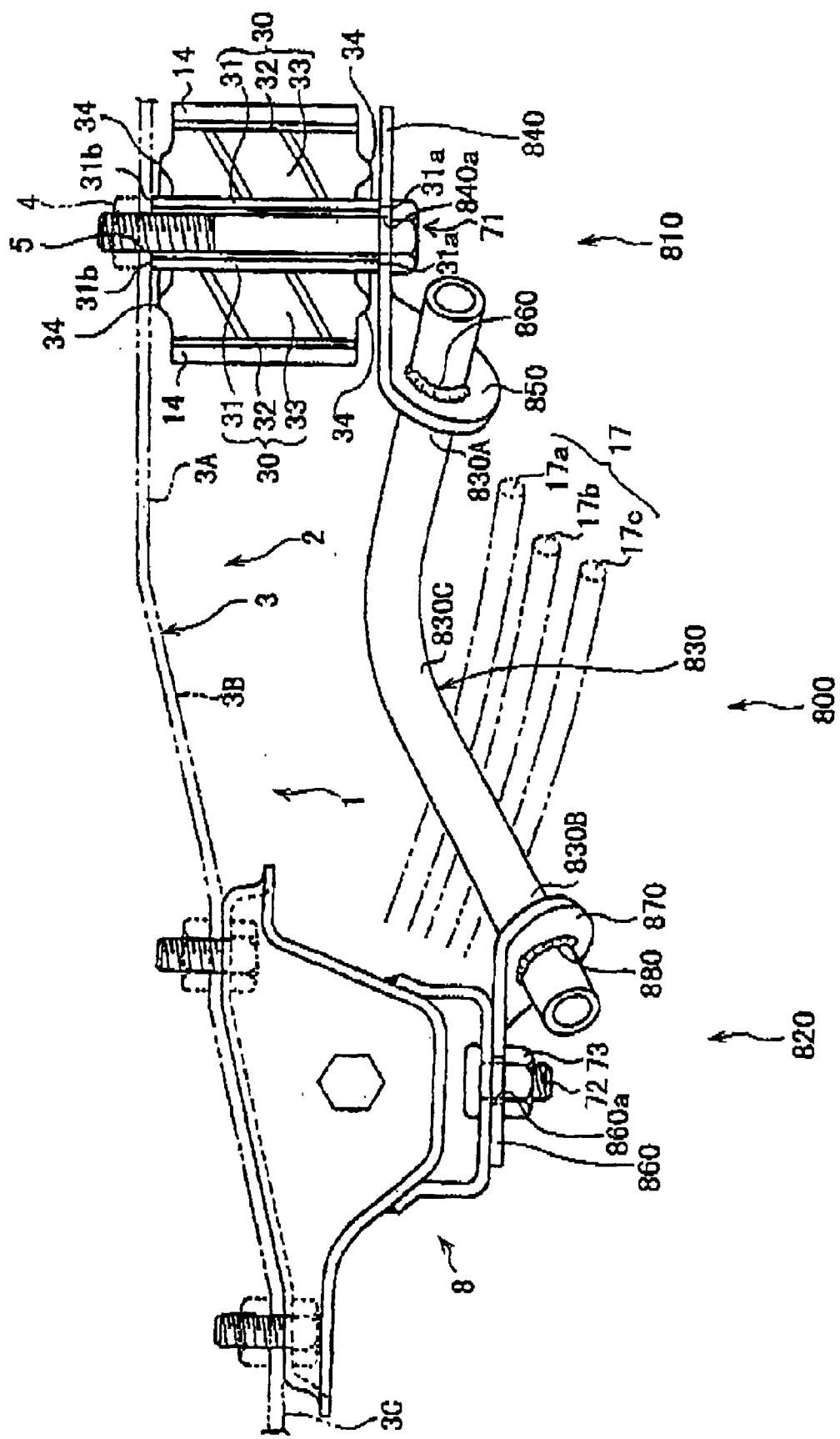
FIG. 8 is the schematic bottom view of a vehicle at a back side for explaining the sub-frame support structure as a fourth embodiment of the present invention.
Figure 9:
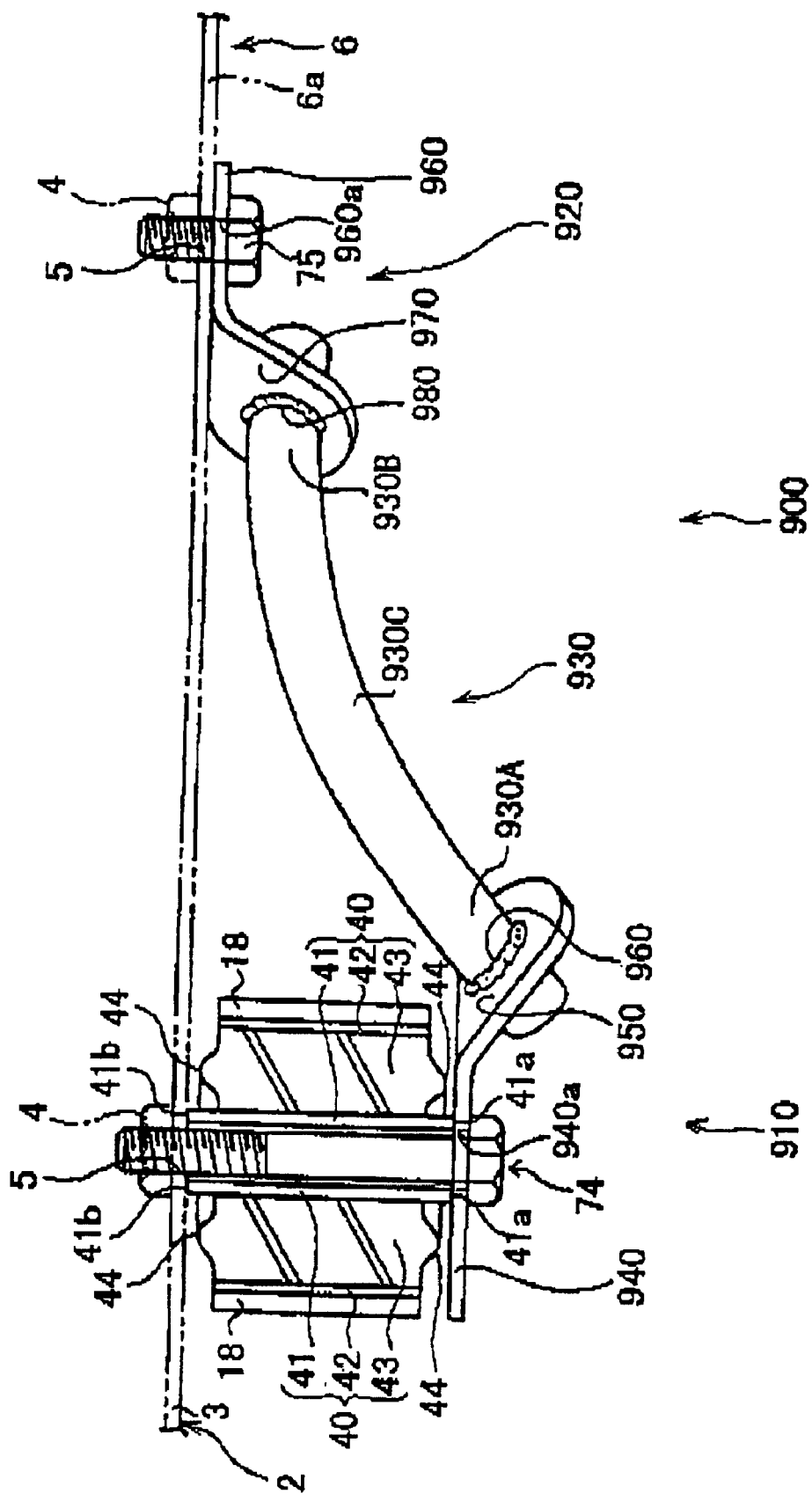
FIG. 9 is the schematic boom view of a vehicle at a back side for explaining a sub-frame support structure as a fifth embodiment of the present invention.

FIGS. 8 and 9 are schematic bottom views of vehicles back side for explain the sub-frame support structures as a fourth embodiment of the present invention. FIGS. 8 and 9 correspond respectively to FIGS. 6 and 7 of the third embodiment. In the figures, members corresponding to those in the third embodiment are indicated by the same reference numerals, and the detailed explanations on these common members are omitted.

As shown in FIG. 8, a bushing-side fitting 810 of a first stay 800 is formed by bending a planer member. The bushing-side fitting 810 has a bushing-side fixing part 840, a bushing-side supporting part 850 with a bushing-side pipe insertion hole 860. The bushing-side fixing part 840 is for the lower edge 31a of the inner cylinder 31. The bushing-side supporting part 850 is formed to be integral with the bushing-side fixing part 840 by downwardly bending the fitting 810. The bushing-side supporting part 850 extends in a direction crossing the center axis of a pipe 830 at a first end 830A with an inclination of not making a right angle. The bushing-side pipe insertion hole 860 is an opening formed on the bushing-side supporting part 850 in the form of an orbital. The first end 830A of the pipe 830 is inserted to the bushing-side pipe insertion hole 860 at a predetermined angle. Then, the pipe 830 is welded to the bushing-side supporting part 850.

Similarly to the bushing-side fitting 810, the body frame-side fitting 820 is formed with a planer member by bending the same. The bushing-side fitting 810 has a bracket-side fixing part 860, and a bracket-side supporting part 870 with a bracket-side pipe insertion hole 880. The bracket-side fixing part 860 is fixed to the lower edge 31a of the inner cylinder 31. The bracket-side supporting pat 870 is formed to be integral with the bracket-side fixing part 860 by downwardly bending the fitting 820 and extends in a direction crossing with the center axis of the pipe 830 at a second end 830B with the inclination not making the right angle. The bracket-side pipe insertion hole 880 is an opening formed on the bushing-side supporting part 850 in the form of orbital. The second end 830B of the pipe 830 is inserted into the bracket-side pipe insertion hole 880. Then, the pipe 830 is welded to the bracket-side supporting part 870.

The pipe 830 has the same structure as the pipe 680 of the third embodiment. The pipe 830 is formed by bending a cylindrically elongated member with an appropriate diameter and thickness selected on the basis of necessary strength, As mentioned as to the pipe 630, the first and seconds ends 830A and 830B of the pipe 830 are inserted respectively to the bushing-side and bracket-side pipe insertion holes 860 and 880 and are welded thereto.

As shown in FIG. 9, a bushing-side fitting 910 of a second stay is formed by bending the planer member. The bushing-side fitting 910 has a bushing-side fixing part 940, a bushing-side supporting part 950 with a bushing-side pipe insertion hole 960. The bushing-side fixing part 940 is to the lower edge 41a of the inner cylinder 41. The bushing-side supporting part 950 is formed to be integral with the bushing-side fixing part 940 by downwardly bending the fitting 810. The bushing-side supporting part 950 extends in a direction crossing a center axis of a pipe 930 at a first end 980A with the inclination of not making a right angle. The bushing-side pipe insertion hole 960 is an opening formed on the bushing-side supporting part 950 in the form of an orbital. The first end 930A of the pipe 930 is inserted into the bushing-side pipe insertion hole 960. Then, the pipe 930 is welded to the bushing-side supporting part 950.

Similarly to the bushing-side fitting 910, the body frame side fitting 920 is formed with a planer member by bending the same. The body frame-side fitting 920 has a member fixing part 960, and a member-side supporting part 970 with a member-side pipe insertion hole 980. A surface of the member-side fixing part 960 is fixed on a bottom face 6a of the body cross member 6, The member-side supporting part 970 is formed to be integral with the member-side fixing part 960 by downwardly bending the fitting 920, and extends in a direction cross with the center axis of the pipe 930 at a second end 930B with the inclination of not making a right angle. The member-side pipe insertion hole 980 is an opening formed on the member-side supporting part 970 in the form of an oval. The second end 930B of the pipe 980 is inserted into the member-side pipe insertion hole 980. Then, the pipe 980 is welded to the member-side supporting part 970.

The pipe 930 has the same structure as the pipe 630 of the third embodiment. The pipe 930 is formed by bending a cylindrically elongated member with the appropriate diameter and thickness selected on the basis of necessary strength. As mentioned as to the pipe 630, the first and seconds ends 930A and 930B of the pipe 930 are inserted respectively to the bushing-side and member-side pipe insertion holes 960 and 980 and are welded thereto.

The first and the second stays 800 and 900 can be manufactured more easily than when manufactured by drawing. Furthermore, it is possible to reduce cost of a material, the cost for forming and for preparing a die, thereby increasing the productivity.

In the first st 800 as mentioned above, the bushing-side fitting 810 extends in a direction crossing the central axis of the first end 830A with inclination of not making a right angle, the body frame-side fittings 820 has the orbital opening, and the ends of the pipe 800 is passed through the opening. Therefore, it is possible that the first ends 830A can hold the bushing-side fitting 810 at a predetermined position, and the second end 830B can hold the body frame-side fitting 820 also at a predetermined position. Therefore, the welding operation of the bushing-side and the frame-side fittings 810 and 820 to the pipes 830 is easily vehicleried out. Thus, the productivity of the first stay 800 is drastically improved.

It is obvious that the second stay 900 has substantially same effect, so that the explanation therefor is omitted.

(Fifth Embodiment)

Figure 10:
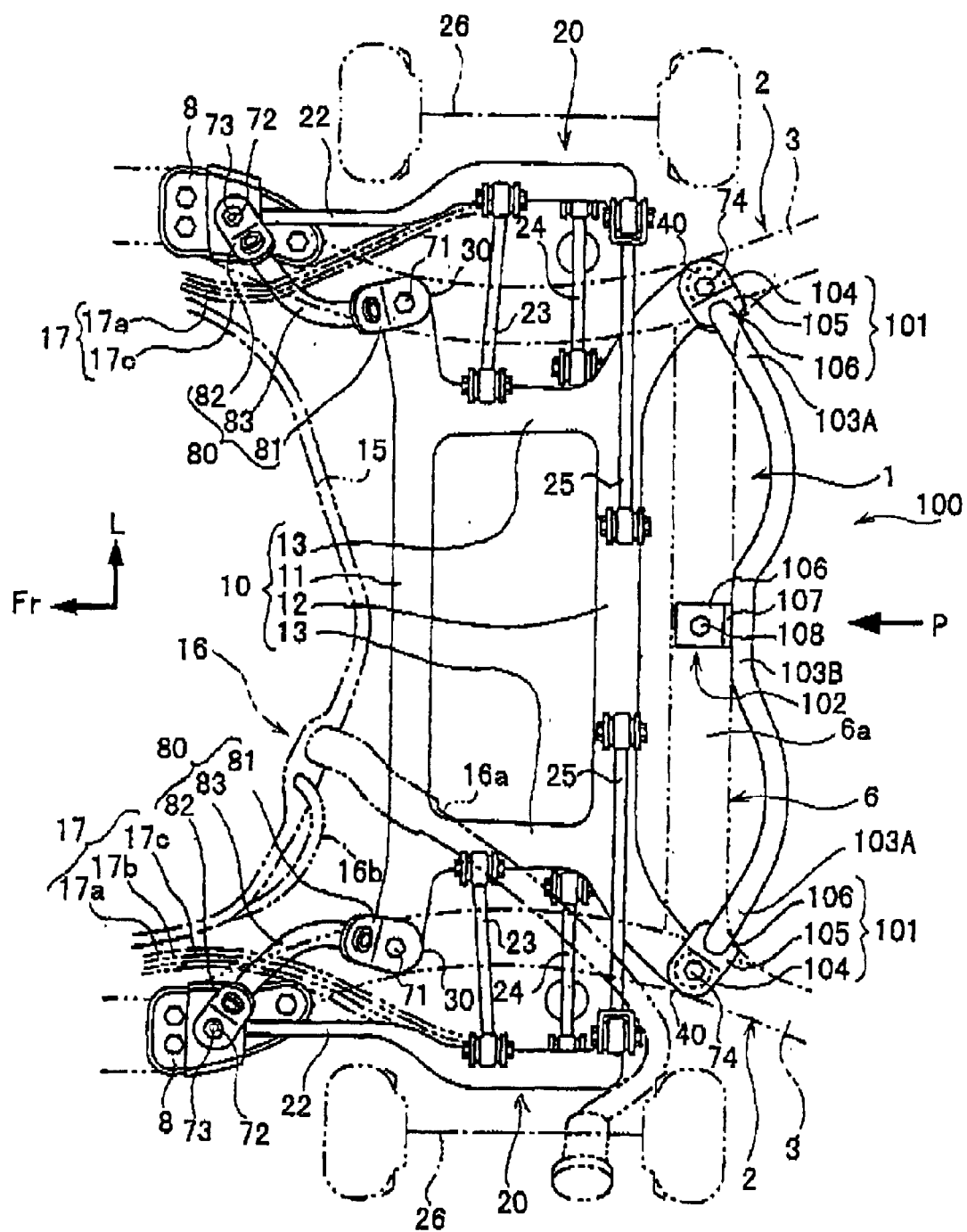
FIG. 10 is a schematic bottom view of a vehicle at a back side for explaining a sub-frame support structure as a sixth embodiment of the present invention.
Figure 11:
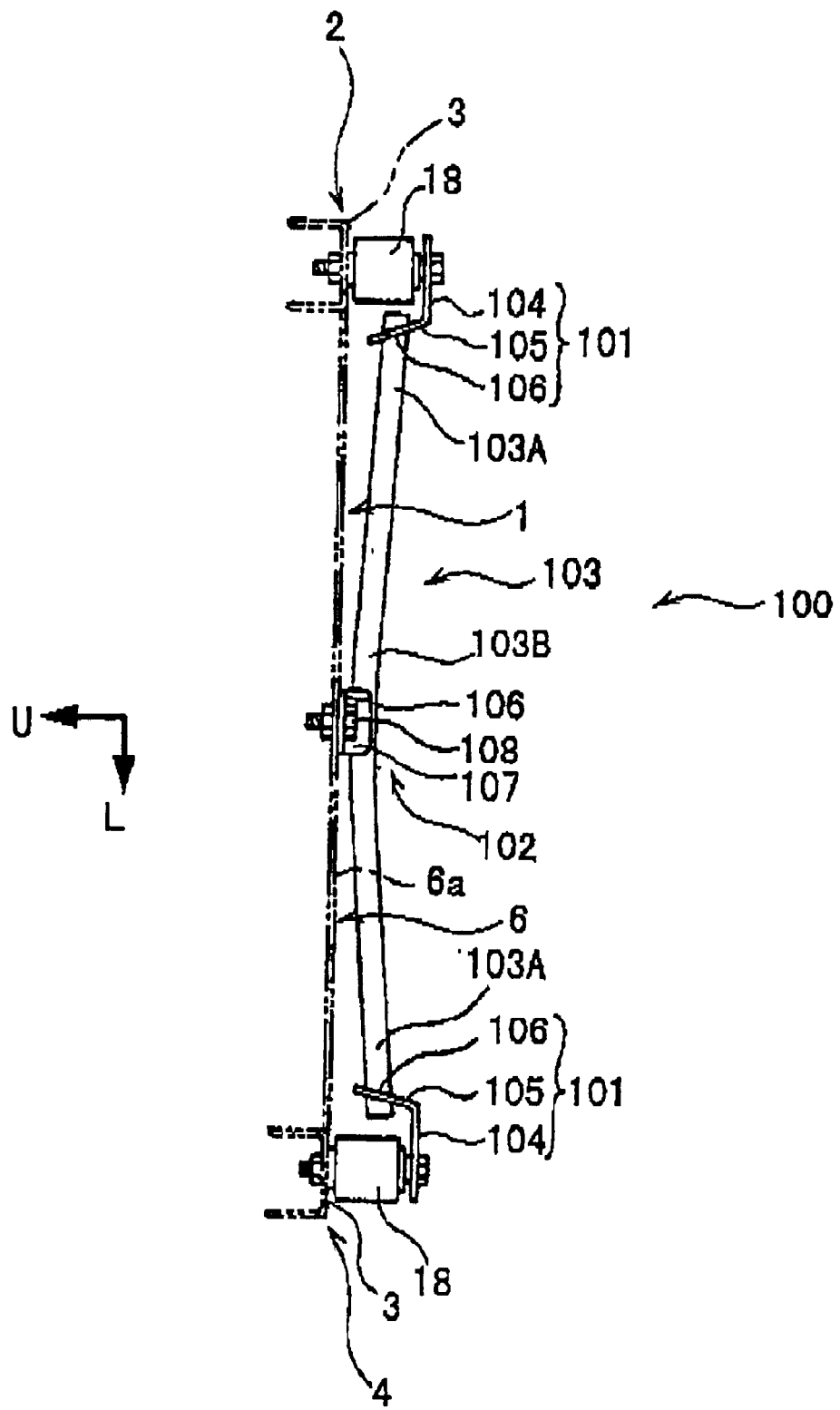
FIG. 11 is the view of a part shown in FIG. 10 seen from the direction of an arrow P.

FIG. 10 is a schematic bottom view of the vehicle at a back side for explaining a supporting structure of sub-frame as a fifth embodiment, and FIG. 11 is a view of a part shown in FIG. 10 seen from the direction of an arrow P.

In FIGS. 10 and 11, members corresponding to those in the third or fourth embodiment are indicated by the same reference numerals, and the detailed explanations on these common members are omitted. Characteristic point of the fifth embodiment is that the second stays 900 in the fourth embodiment are replaced by a second stay 100 formed as an integral body. The second stay 100 extends in the widthwise direction between the main frames 2, and a center part of the second stay 100 with respect to the widthwise direction is fixed to the lower face 6a of the body cross member 6.

In the fifth embodiment, the second stay 100 is composed of a pair of the bushing-side fittings 101, the body frame-side fitting 102 and the pipe 103.

Equally to the fourth embodiment, each of the bushing-side fixation fitting 101 is formed by bending a planer member to have a bushing-side fixing part 104, and a bushing-side supporting part 105 with a bushing-side pipe insertion hole 106. The bushing-side fixing parts 104 are fixed to the lower edges of the inner cylinders (not shown) of the bushings 40. Each of the bushing-side supporting parts 105 is obtained by upwardly beading the bushing-side fitting 101. The bushing-side supporting part 106 extends in directions crossing a center axes of an end 103A of the pipe 103, with the inclination of not making a right angle. The bushing-side pipe insertion hole 106 is an opening formed on the bushing-side supporting part 105 in the form of orbital. The end 103A of the pipe 103 is inserted to the bushing side pipe insertion holes 106 and the pipe 103 is welded thereto.

The body frame-side fixation fitting 102 is also formed by bending the planer member and includes the member-side fixing part 106 and a member-side supporting part 107. The member-side fixing part 106 is fixed to the body cross member 6 with the lower 6a being contacted with a face of the member-side fixing part 106. The member-side supporting part 107 is obtained by downwardly bending the body frame-side fitting 102 and is integral with the member-side fixing part 106. The member-side supporting part 107 is fixed by welding to a part of the outer periphery of the pipe 103 at a center with respect to the width. The member side fixing part 106 has the penetration hole. An installation bolt 108 is inserted to the penetration hole for fixing the pipe 103 to the body cross member 6.

The pipe 103 is formed as an integral body by bending the cylindrically elongated member with the predetermined diameter and thickness selected on the basis of a required strength. The pipe 103 has a gently bent shape with intermediate part between the ends 103A and the center part 103B curved to the rear side of the body.

Each end 101 of the second stay 100 is supported on a lower edge of the elastic bushing 40 provided on the main frame 2 via the bushing-side fitting 102, and the center part thereof with respect to the vehicle width is supported on the lower face 6a of the body cross member 6 by the body frame-side fitting 102.

With the above-mentioned structure, the strength of the second stay 100 in the widthwise direction is increased, and the supporting strength of the elastic bushings 40 in the widthwise direction is also increased. Accordingly, it is possible to restrain the displacement of the rear side of the sub-frame 10 in the widthwise direction, and an improved drivability and stability can be attained. Moreover, it is possible to perform the installation of the second stay 100 to the body cross member 6 by the single installation bolt 108, whereby the members to be used are decreased in number, assembly is simplified, and the number of the manufacturing process is decreased. Thus, the productivity of the sub-frame support structure is improved.

Furthermore, the first stays 500 and 800 and the second stays 600, 900 and 100 containing the bent pipes may have different forms as long as the stays are deformable by bending in appropriate directions when a load is applied to the stays from any direction.

For example, it is possible to prepare at least one depression at a center part of a straight pipe on the lateral face as a weak portion so as to bend the pipe at the weak portion in a required direction when a load exceeding a certain value is applied in a certain direction. It is also possible to use a round bar member instead of the pipe.

Furthermore, it is possible to use the elastic bushings 30 and 40 in different numbers from the above description for supporting the sub-frame 1 on the main frames 2. It is also possible to provide the first stay 500 and the second stay 600 on a single bushing, or some bushings can be selectively used for supporting the stays 500 and 600. The locations to provide the stay or the longitudinal directions thereof are not limited to the above embodiments and the provisions are not only necessarily right and left symmetric, front and back but also symmetric.

As understood from the above, the support strength of the sub-frame support structure of the present invention against a force applied to the longitudinal directions of the first stay and the second stay is increased because the lower edge of the elastic bushing and the body frame are connected with each other by the first stay which extends in the widthwise direction and by the second stay which extends along the body frame in a different direction from the extending direction of the first stay. Furthermore, it is possible to restrain the displacement of the sub-frame with respect to the body frame in the longitudinal directions of the first and second stays without the vibrations. Therefore, it is possible to maintain the excellent drivability and stability with the first and second stays set to appropriately have their longitudinal directions.

Furthermore, by the sub-frame support structure as the third to fifth embodiment of the present invention, it is possible to deform the stay by bending in a predetermined direction, when a force exceeding a certain value is applied from a predetermined direction. Therefore, it is possible that the initial function of protecting the other equipment nearby can be maintained even when the stay is deformed by bending when the impact load is applied to the body.

The invention being thus described, it will be clearly understood that the same may be varied in many ways. Such variations are to be regarded as a departure from the spirit and scope of the present invention, and all such modification as would be easily understood to one skilled in the art are intended to be included within the scope of the appended claims.

What is claimed is:

1. A supporting structure of a sub-frame for a suspension system of a vehicle, comprising:

a body frame having a body frame lower face to be provided on a bottom face of a body of said vehicle;

a sub-frame for supporting suspension members, said sub-frame extending in a widthwise direction and provided at a lower position than said body frame;

elastic bushings, each having an inner cylinder, an outer cylinder and an elastic member interposed between said inner cylinder and said outer cylinder, said inner cylinder having a vertically extending center axis, an inner cylinder upper edge and an inner cylinder lower edge, said inner cylinder upper edge being fixed to said body frame lower face, and said outer cylinder provided coaxially to said inner cylinder and fixed to said sub-frame, said sub-frame being supported on said body frame via said elastic bushings;

a pair of first stays, each extending along said body frame from a first stay first end to a first stay second end, said first stay first end being supported on a respective one of said inner cylinder lower edges, and said first stay second end being supported on said body frame; and a pair of second stays, each extending along said body frame from a second-stay first end to a second-stay second end in a different direction from said first stays, said second-stay first end being supported on a respective one of said inner cylinder lower edges, and said second-stay second end being supported on said body frame.

2. The supporting structure of a sub-frame as claimed in claim 1, wherein said body frame comprises a pair of main frames, each extending in a lengthwise direction and spaced from each other in a widthwise direction, and a body cross member extending in said widthwise direction connecting said main frames, said first stays respectively extending along said main frames, and said second stays extending along said body cross member in a vehicle widthwise direction.

3. The supporting structure of a sub-frame as claimed in claim 2, wherein said sub-frame includes a sub-frame front part and a sub-frame rear part, said elastic bushings being provided on said sub-frame front part and said sub-frame rear part, each of said first stays connecting an inner cylinder lower edge of one of said elastic bushings provided on said sub-frame front part and one of said main frames, and said second stays connecting an inner cylinder lower edge of respective elastic bushings provided on said sub-frame rear part and said body cross member.

* * * * *